US010951758B2

(12) United States Patent
Cinelli et al.

(10) Patent No.: US 10,951,758 B2
(45) Date of Patent: Mar. 16, 2021

(54) METHOD AND SYSTEM FOR REMOTE INTERACTION BETWEEN AT LEAST ONE OPERATOR AND AT LEAST ONE USER

(71) Applicant: Inventia S.R.L., Milan (IT)

(72) Inventors: Andrea Cinelli, Mi (IT); Antonio Minosi, Mi (IT); Alberto Garoffolo, Mi (IT)

(73) Assignee: Inventia S.R.L., Milan (IT)

( * ) Notice: Subject to any disclaimer, the term of this patent is extended or adjusted under 35 U.S.C. 154(b) by 0 days.

(21) Appl. No.: 16/489,223

(22) PCT Filed: Feb. 26, 2018

(86) PCT No.: PCT/IB2018/051177
§ 371 (c)(1),
(2) Date: Aug. 27, 2019

(87) PCT Pub. No.: WO2018/154527
PCT Pub. Date: Aug. 30, 2018

(65) Prior Publication Data
US 2020/0007689 A1 Jan. 2, 2020

(30) Foreign Application Priority Data

Feb. 27, 2017 (IT) .................. 102017000022073

(51) Int. Cl.
H04M 3/51 (2006.01)
H04L 29/08 (2006.01)
H04L 29/06 (2006.01)
H04M 7/00 (2006.01)

(52) U.S. Cl.
CPC .......... H04M 3/5141 (2013.01); H04L 67/34 (2013.01); H04L 67/40 (2013.01); H04M 7/0027 (2013.01); H04M 3/5183 (2013.01)

(58) Field of Classification Search
None
See application file for complete search history.

(56) References Cited

U.S. PATENT DOCUMENTS

| 10,332,074 | B1* | 6/2019 | Gallagher | G06Q 10/103 |
|---|---|---|---|---|
| 2009/0086957 | A1* | 4/2009 | Kelley | H04M 3/567 379/265.09 |
| 2014/0128040 | A1* | 5/2014 | Guglielmo | H04W 4/16 455/414.1 |
| 2014/0208384 | A1 | 7/2014 | Youssefian et al. | |

* cited by examiner

Primary Examiner — Antim G Shah
(74) Attorney, Agent, or Firm — Workman Nydegger

(57) ABSTRACT

It is disclosed a method for remote interaction between an operator and a user, comprising the following steps: a) configuring, on a user's electronic device, a list of interaction processes; b) bidirectionally connecting the user's electronic device to the operator's electronic device; c) exchanging text messages between the operator's electronic device and the user's electronic device; d) configuring in real-time the user's electronic device to execute a step of an interaction process; e) configuring in real-time the operator's electronic device to execute said step of the selected interaction process; f) verifying whether the step of the selected interaction process has been executed; g) in case of a positive verification, approving the step of the selected interaction process and repeating d), e), f), g); h) in case of a negative verification, waiting for execution of the step of the selected interaction process and returning to f).

18 Claims, 14 Drawing Sheets

METHOD AND SYSTEM FOR REMOTE INTERACTION BETWEEN AT LEAST ONE OPERATOR AND AT LEAST ONE USER

BACKGROUND

Technical Field

The present disclosure relates to the field of remote interaction between at least one operator and at least one user.

Description of the Related Art

The use of online chats to provide assistance from an operator of a service centre to different remote clients is known.

There are also known methods for remotely identifying an individual user by using an audio/video chat, for example to enter into distance contracts having legal validity or to issue a digital signature.

The Applicant has observed that the prior art has the disadvantage of not allowing an efficient real-time interaction between an operator and a remote user who are connected to each other through a telecommunications network.

BRIEF SUMMARY

The present disclosure concerns a method for remote interaction between an operator and a user as defined in the enclosed claim 1 and by the preferred embodiments thereof described in the dependent claims 2 to 9.

The interaction method is implemented using at least one computer and it comprises the following steps:

a) configuring, on a user's electronic device, a list of interaction processes, wherein each one of said interaction processes is implemented by means of a plurality of steps executed by means of the interaction between the user's electronic device and an operator's electronic device through a data communication channel of a telecommunications network;
b) bidirectionally connecting the user's electronic device to the operator's electronic device by means of said data communication channel through the telecommunications network;
c) exchanging text messages between the operator's electronic device and the user's electronic device by means of an online chat and/or exchanging audio or audio/video messages by means of an online audio or audio/video chat, wherein the text and/or audio or audio/video messages are carried through said telecommunications network;
d) configuring in real-time the user's electronic device to execute a step of an interaction process selected from said list of interaction processes;
e) configuring in real-time the operator's electronic device to execute said step of the selected interaction process;
f) verifying whether the step of the selected interaction process has been executed by means of the user's electronic device;
g) in the case of a positive verification, approving the step of the selected interaction process and repeating steps d), e), f), g) for at least one further step of the selected interaction process;
h) in the case of a negative verification, waiting for execution of the step of the selected interaction process and returning to f).

The Applicant has perceived that the interaction method according to the present disclosure has the advantage to allow an efficient real-time interaction between an operator and at least one remote user who are connected to each other through a data communication channel of a telecommunications network.

In one embodiment, in step a) each interaction process is a procedure comprising a defined sequence of steps, i.e. each interaction process is implemented by means of a plurality of predefined steps.

The use of a defined sequence of steps (combined with the above indicated verification whether the step has been executed, with the approval in case of positive verification and with the repetition of the selection, of the real-time configuration, of the verification and of the approval in case of positive verification) provides the advantage to guide the operator to execute a procedure comprising a plurality of predefined steps, so that the operator can't deviate from the procedure, thus avoiding the risk for the operator to skip the execution of one or more steps and reducing the risk to forget the collection of important data from the user.

One embodiment of the present disclosure is a method for remote interaction between an operator and a plurality of users.

The method is implemented using at least one computer and it comprises the following steps:

a) configuring, on a plurality of users' electronic devices, a respective list of interaction processes, wherein each one of said interaction processes is implemented by means of a plurality of steps executed by means of the interaction between the respective user's electronic device and the operator's electronic device through a data communication channel of a telecommunications network;
b) bidirectionally connecting the plurality of users' electronic devices to the operator's electronic device by means of a respective plurality of data communication channels through the telecommunications network;
c) exchanging text messages between the operator's electronic device and the plurality of users' electronic devices by means of a corresponding plurality of online chats, which are independent of each other, and/or exchanging audio or audio/video messages by means of a corresponding plurality of online audio or audio/video chats which are independent of each other, wherein the text and/or audio or audio/video messages are carried through said telecommunications network;
d) selecting a first user's electronic device out of the plurality of users' electronic devices and configuring in real-time the first user's electronic device to execute a step of a first interaction process selected from the respective list of interaction processes;
e) configuring in real-time the operator's electronic device to execute said step of the first interaction process;
f) verifying whether the step of the first interaction process has been executed by means of the first user's electronic device;
g) in the case of a positive verification, approving the step of the first interaction process and repeating steps d), e), f) and g) for at least one further step of the first interaction process;
h) in the case of a negative verification, waiting for execution of the step of the first interaction process and returning to step f).

In one embodiment, in step a) each interaction process is a procedure comprising a defined sequence of steps, i.e. each interaction process is implemented by means of a plurality of predefined steps.

The use of a defined sequence of steps (combined with the above indicated verification whether the step has been executed, with the approval in case of positive verification and with the repetition of the selection, of the real-time configuration, of the verification and of the approval in case of positive verification) provides the advantage to guide the operator to execute a procedure comprising a plurality of predefined steps, so that the operator can't deviate from the procedure, thus avoiding the risk for the operator to skip the execution of one or more steps and reducing the risk to forget the collection of important data from the user.

In one embodiment, in step a), the interaction method comprises configuring, on the first and a second user's electronic device selected from the plurality of users' electronic devices, a first and second list of interaction processes, respectively, wherein each process on the first list of interaction processes is implemented by means of a first plurality of steps executed by means of the interaction between the first user's electronic device and the operator's electronic device through the telecommunications network and wherein each process on the second list of interaction processes is implemented by means of a second plurality of steps executed by means of the interaction between the second user's electronic device and the operator's electronic device through the telecommunications network. Moreover, in step b) the interaction method comprises bidirectionally connecting the first and the second users' electronic devices to the operator's electronic device by means of a first and a second data communication channel, respectively, through the telecommunications network. Furthermore, step c) of the data interaction method comprises exchanging text messages between the operator's electronic device and the first user's electronic device by means of a first online chat and/or exchanging audio or audio/video messages by means of a first online audio or audio/video chat, wherein the text and/or audio or audio/video messages are carried through said telecommunications network, and step c) comprises exchanging text messages between the operator's electronic device and the second user's electronic device by means of a second online chat which is independent of the first online chat, and/or exchanging audio or audio/video messages by means of a second online audio or audio/video chat which is independent of the first online audio or audio/video chat, wherein the text messages and/or audio or audio/video messages are carried through said telecommunications network. Moreover, the interaction method further comprises step d1) of selecting a second user's electronic device from the plurality of users' electronic devices and configuring in real-time the second user's electronic device to execute a step of a second interaction process selected from the second list of interaction processes, wherein the second process is independent of the first process, comprises step e1) of further configuring in real-time the operator's electronic device to execute said step of the second interaction process, comprises step f1) of verifying whether the step of the second interaction process has been executed by means of the second user's electronic device, comprises step g1), in the case of a positive verification, of approving said step of the second interaction process and repeating steps d1), e1), f1), g1) for at least one further step of the second interaction process, and comprises step h1), in the case of a negative verification, of waiting for execution of the step of the second interaction process and returning to step f1) for verification of the execution of the step of the second process.

In one embodiment, the interaction method further comprises the step of setting up a common communication channel between the operator's electronic device and the first and the second user's electronic device, the step of merging the first and the second online chat into a common online chat and/or merging the first and the second audio or audio/video chat into a common online audio or audio/video chat, and the step of exchanging text messages between the operator's electronic device and the first and second user's electronic device by means of the common online chat and/or exchanging audio or audio/video messages by means of the common online audio or audio/video chat.

In one embodiment, the interaction method further comprises the step of sharing, between the first and the second user's electronic device, the first or the second interaction process in a shared interaction process, the step of configuring in real-time the first and the second user's electronic device to execute a step of the shared interaction process, the step of further configuring the operator's electronic device to execute the step of the shared interaction process, the step of verifying whether a step of the shared interaction process has been executed by means of the first and/or second user's electronic device, the step, in the case of a positive verification, of approving said step of the shared interaction process and repeating said configurations and verification for at least one further step of the shared interaction process, and the step, in the case of a negative verification, of waiting for execution of the step of the shared interaction process and returning to the verification.

In one embodiment, the selected interaction process is the sharing of a resource between the user's electronic device and the operator's electronic device by means of the data communication channel, and the shared resource is one of the following: a shared form containing fields indicating the user's personal data, the sharing of a digital document, the sharing of the same images displayed on a screen connected to the operator's electronic device and on a screen connected to the user's electronic device.

In one embodiment, the method performs the interaction between a first plurality of operators and a second plurality of remote users and further comprises, between steps a) and b), the step of receiving a call from the first user's electronic device and routing it to a first operator's electronic device according to at least one preconfigured rule.

In one embodiment, the interaction process is a procedure comprising a defined sequence of steps, said procedure being selected from among the following: a procedure for identifying the remote user to issue a digital certificate associated to the remote user, a procedure for the remote user to enter into a distance contract, and a procedure for the remote user to open a remote bank account.

One embodiment of the present disclosure is a computer program as defined in the enclosed claim 10.

One embodiment of the present disclosure is a non-transitory computer readable medium having a program recorded thereon, said program comprising software code portions adapted to perform at least the steps b)-h) of the interaction method, when said program is run on at least one computer.

One embodiment of the present disclosure is an electronic system for interaction between at least one operator and at least one remote user, said system being defined in the enclosed claim 11 and in the preferred embodiments described in the dependent claims 12 to 14.

The electronic interaction system comprises an operator's electronic device controlled by an operator, a user's electronic device controlled by a remote user, a telecommunications network configured to bidirectionally connect the user's electronic device to the operator's electronic device by means of a data communication channel, and a memory to store a list of interaction processes, wherein each one of said interaction processes is implemented by means of a plurality of steps executed by means of the interaction between the user's electronic device and the operator's electronic device through the data communication channel of the telecommunications network. Furthermore, the operator's electronic device and the user's electronic device are configured to exchange text messages by means of an online chat and/or to exchange audio or audio/video messages by means of an online audio or audio/video chat, wherein the text and/or audio or audio/video messages are carried through said telecommunications network. The user's electronic device is configured to configure itself in real time to execute a step of an interaction process selected from said list of interaction processes. Moreover, the operator's electronic device is configured to configure itself in real time to execute said step of the selected interaction process, it is configured configured to verify whether the step of the selected interaction process has been executed by means of the user's electronic device, it is configured, in the case of a positive verification, to approve said step of the selected interaction process and repeat said configuration and verification for at least one further step of the selected interaction process, it is configured, in the case of a negative verification, to wait for execution of said step of the interaction process and repeat said verification.

One embodiment of the present disclosure is a system for interaction between an operator and a plurality of remote users.

The system comprises a plurality of users' electronic devices controlled by a respective plurality of remote users, and it comprises a memory to store a list of interaction processes, wherein each one of said interaction processes is implemented by means of a plurality of steps executed by means of the interaction between the respective user's electronic device and the operator's electronic device through the telecommunications network. Moreover, the plurality of users' electronic devices are bidirectionally connected to the operator's electronic device by means of a respective plurality of data communication channels through the telecommunications network. Furthermore, the operator's electronic device and the plurality of users' electronic devices are configured to exchange text messages by means of respective online chats and/or to exchange audio or audio/video messages by means of respective online audio or audio/video chats, wherein the text and/or audio or audio/video messages are carried through said telecommunications network. Moreover, a first user's electronic device, selected from the plurality of users' electronic devices, is configured to configure itself in real time to execute a step of a first interaction process selected from the respective list of interaction processes. Additionally, the operator's electronic device is configured to configure itself in real time to execute said step of the first interaction process, it is configured to verify whether the step of the first interaction process has been executed by means of the first user's electronic device, it is configured, in the case of a positive verification, to approve said step of the first interaction process and repeat said configuration and verification for at least one further step of the first interaction process, and it is configured, in the case of a negative verification, to wait for execution of said step of the first interaction process and repeat said verification.

In one embodiment, the network further comprises a server interposed between the user's electronic device and the operator's electronic device, wherein said data communication channel crosses the server, the server being configured to execute the step of the selected interaction process.

In one embodiment, the operator's electronic device and the users' electronic devices are selected from among a desktop personal computer, a laptop personal computer, a smartphone, a tablet.

BRIEF DESCRIPTION OF THE SEVERAL VIEWS OF THE DRAWINGS

Further characteristics and advantages of the disclosure will result from the following description of a preferred embodiment and variants thereof provided by way of example with reference to the attached drawings, wherein.

DETAILED DESCRIPTION

It is observed that in the description below identical or similar blocks, components or modules are indicated by the same numerical references in the figures, even if they appear in different embodiments of the disclosure.

Figure 1:
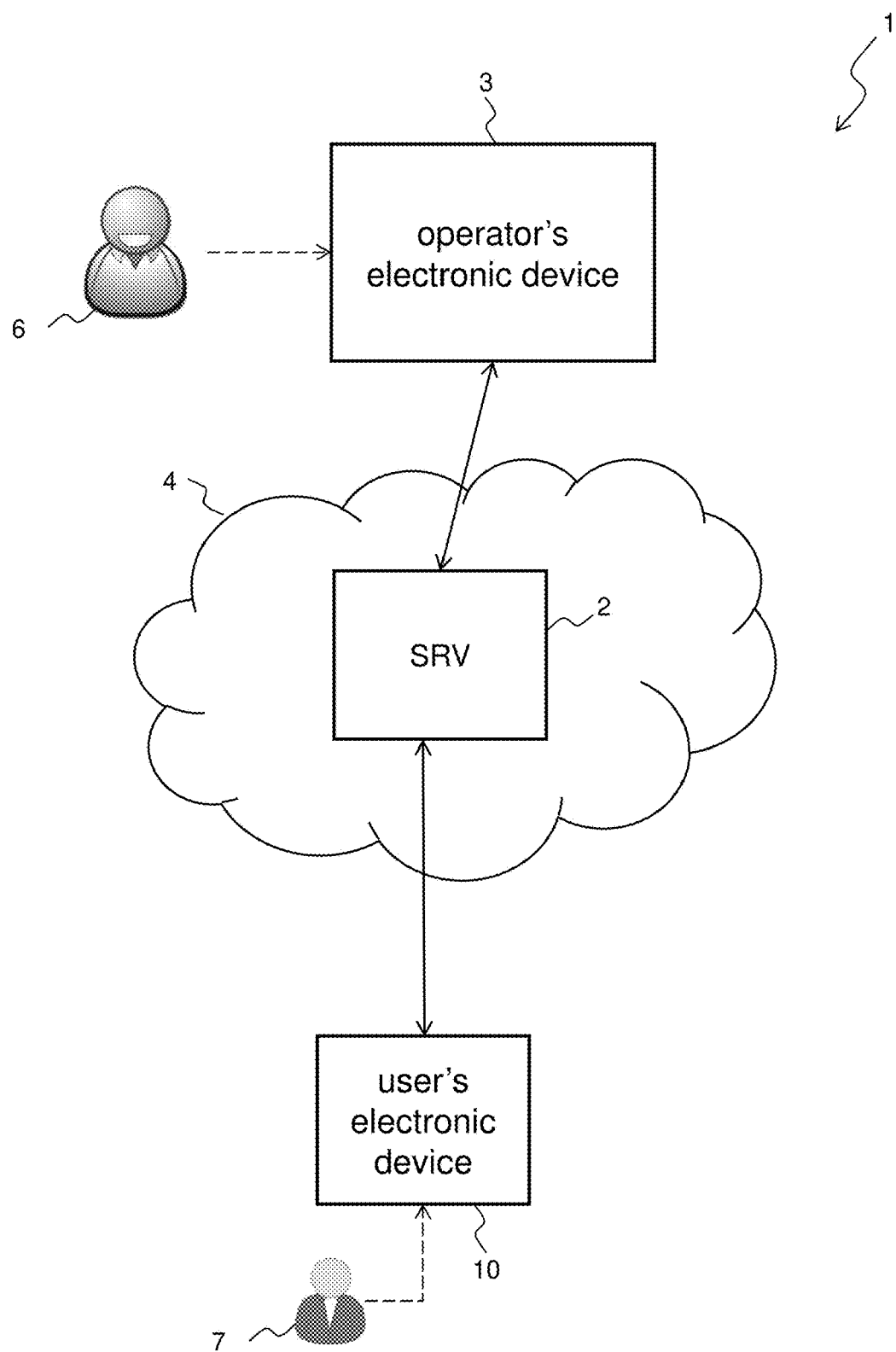
FIG. 1 shows a block diagram of an electronic system for interaction between an operator's electronic device and a user's electronic device according to a first embodiment of the disclosure.

With reference to FIG. 1, it is shown a block diagram of an electronic system 1 for interaction between an operator's electronic device 3 and a user's electronic device 10 according to the first embodiment of the disclosure.

The electronic interaction system 1 comprises:
an operator's electronic device 3;
a user's electronic device 10;
a telecommunications network 4 interposed between the operator's electronic device 3 and the user's electronic device 10.

The telecommunications network 4 has the function of bidirectionally connecting the operator's electronic device 3 to the user's electronic device 10 by means of a data communication channel.

The telecommunications network 4 can be of the fixed, mobile or mixed fixed/mobile type.

Figure 5A:
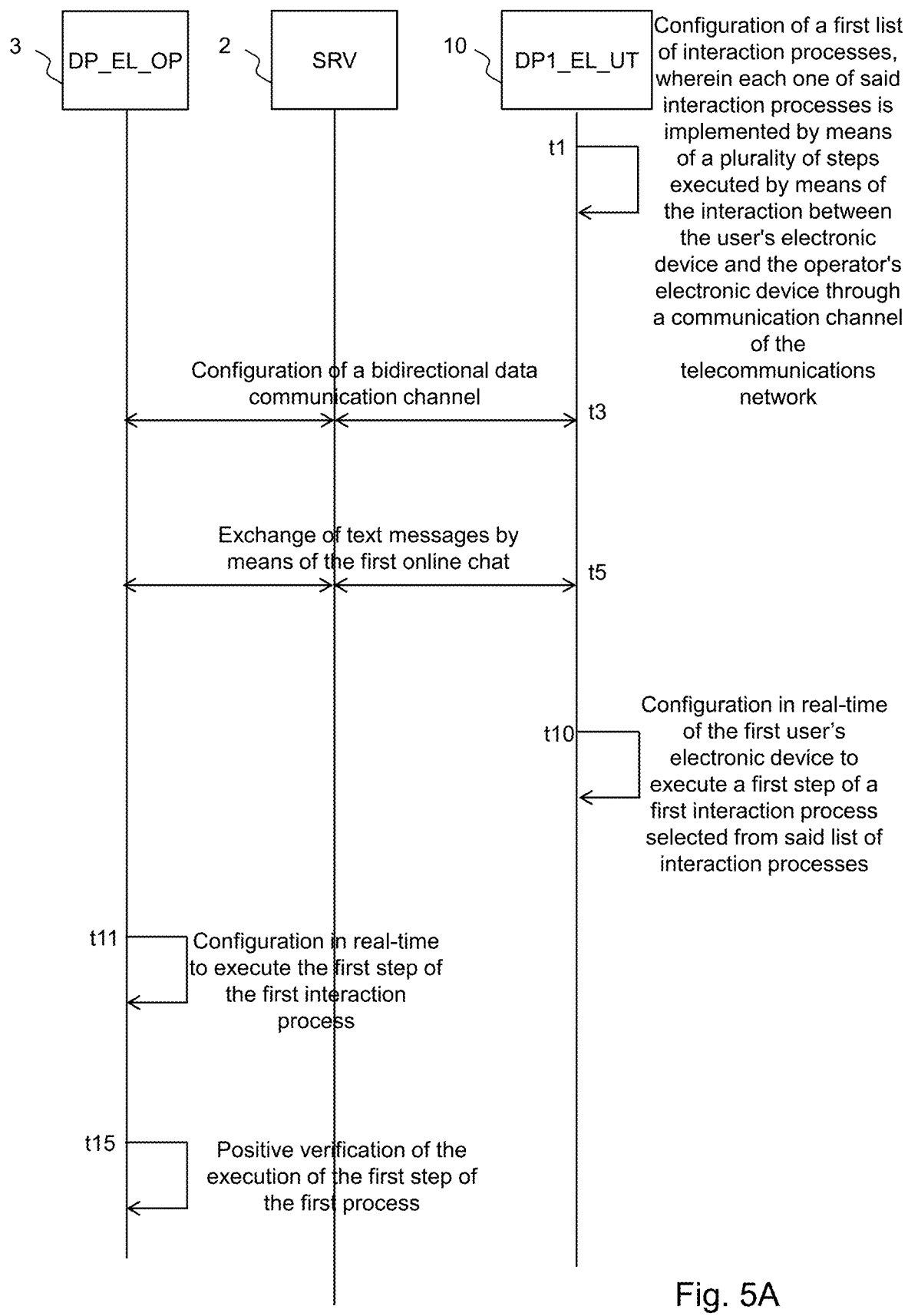
FIGS. 5A-5C show a possible timing diagram representing the interaction method according to the first embodiment of the disclosure.
Figure 5B:
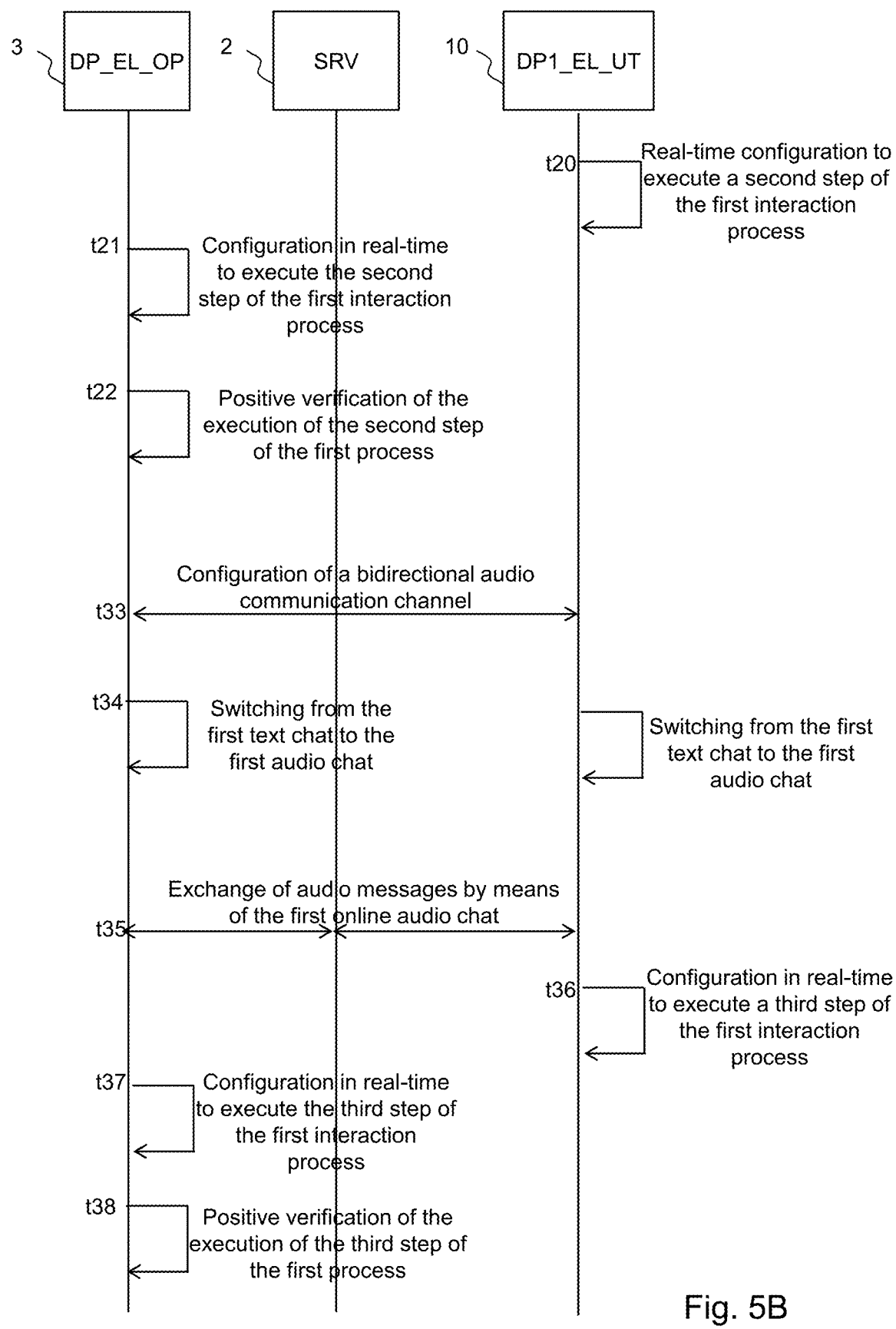
Figure 5C:
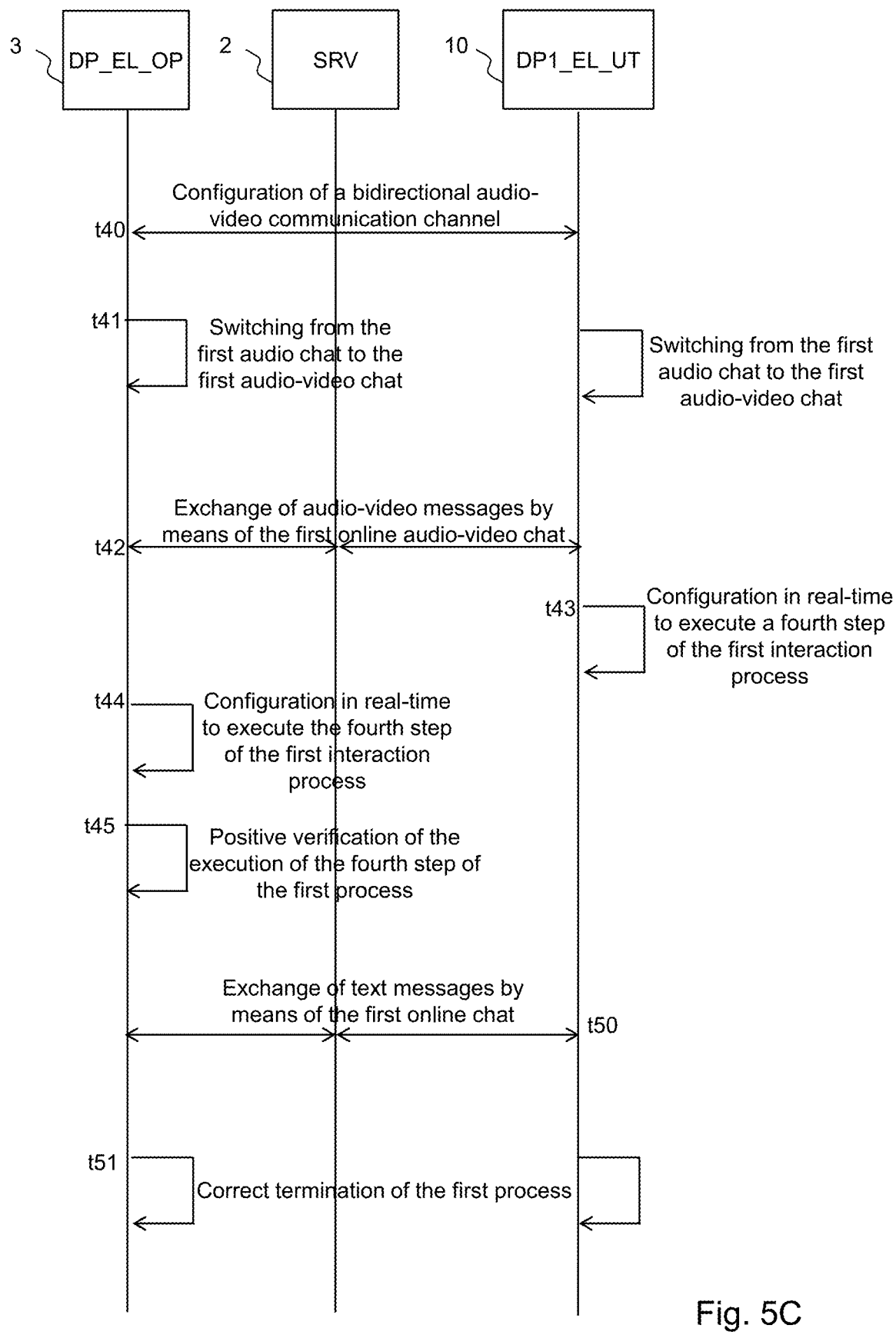
Figure 6A:
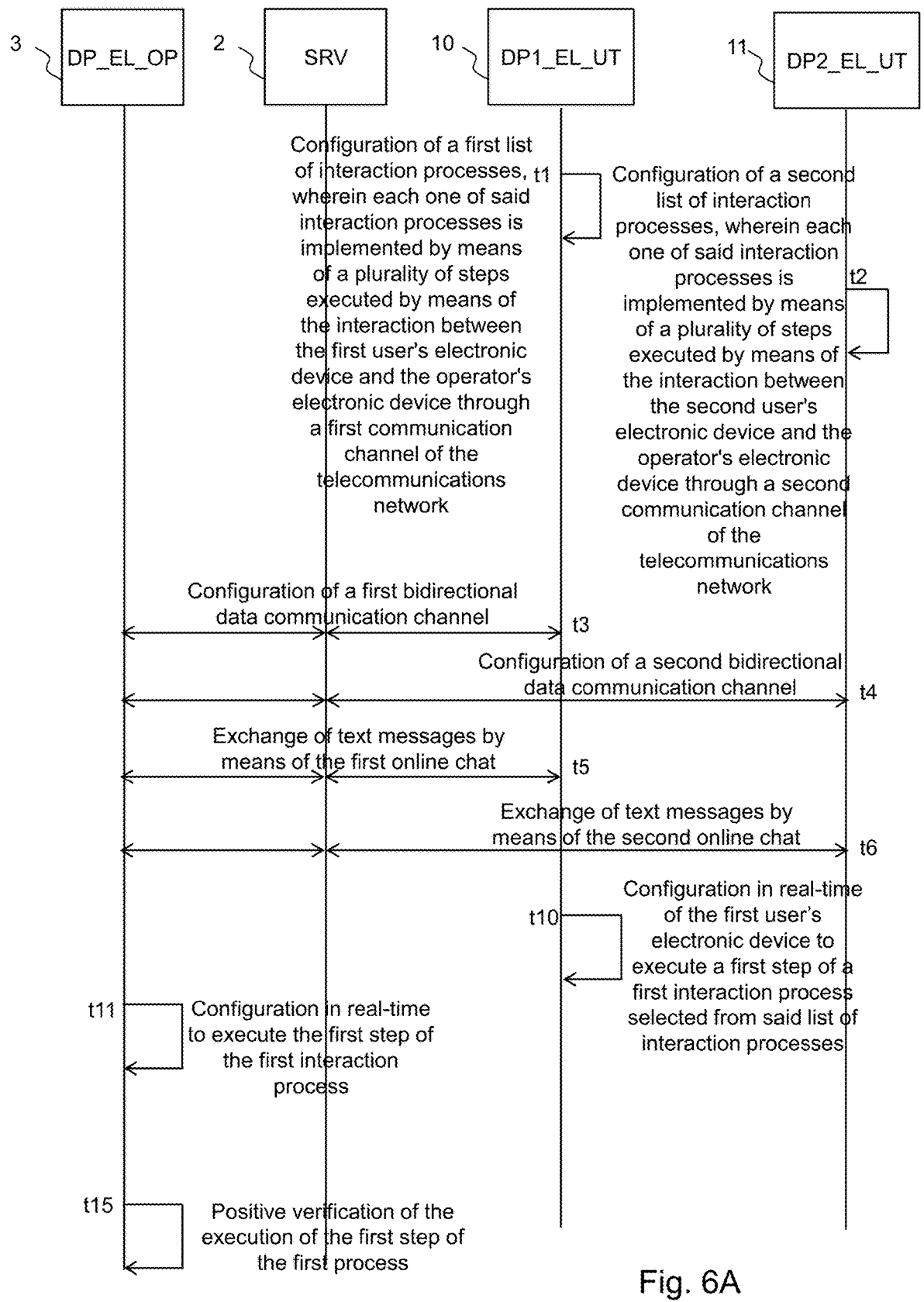
FIGS. 6A-6E show a possible timing diagram representing the interaction method according to second embodiment of the disclosure.
Figure 6B:
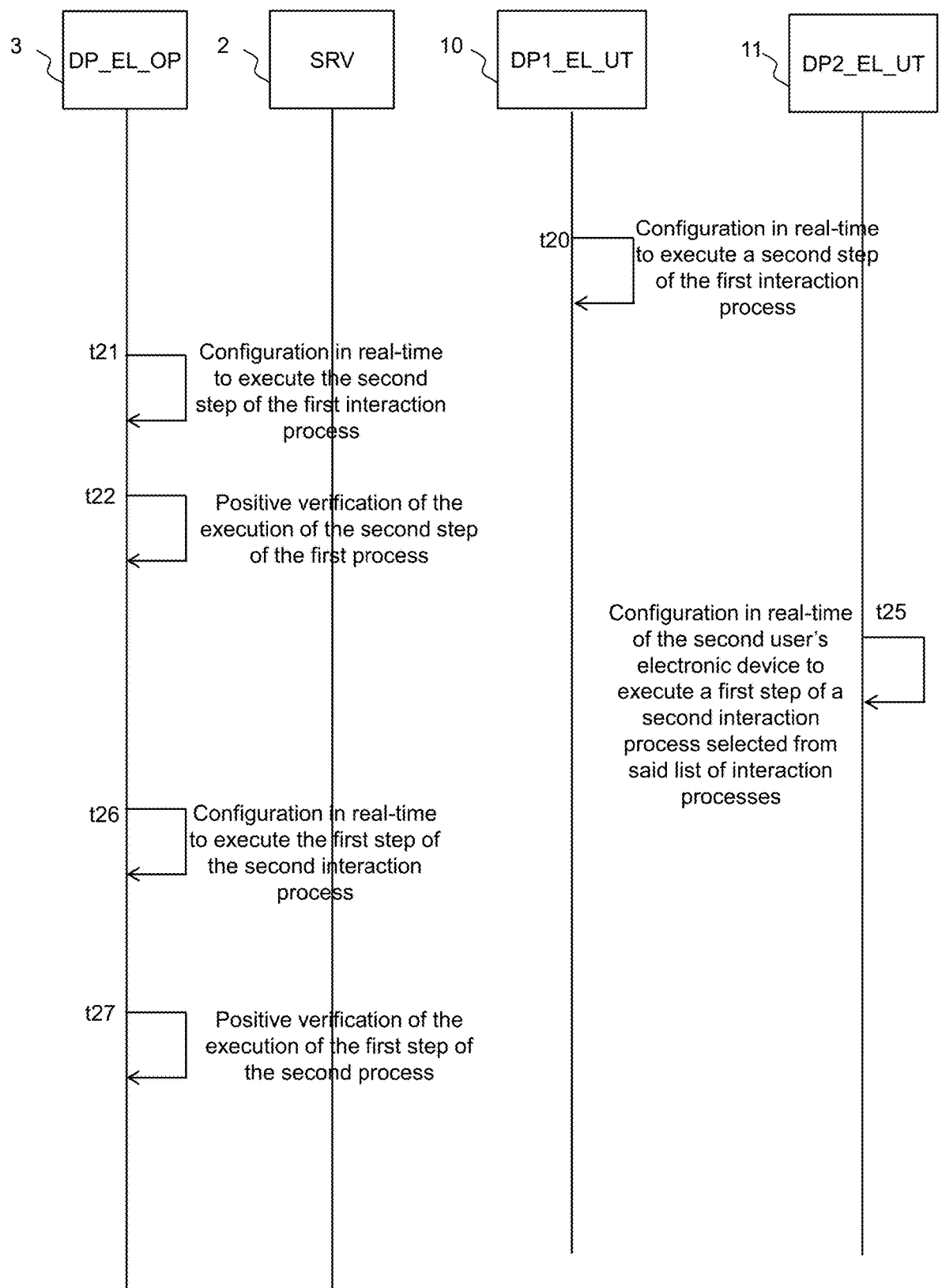
Figure 6C:
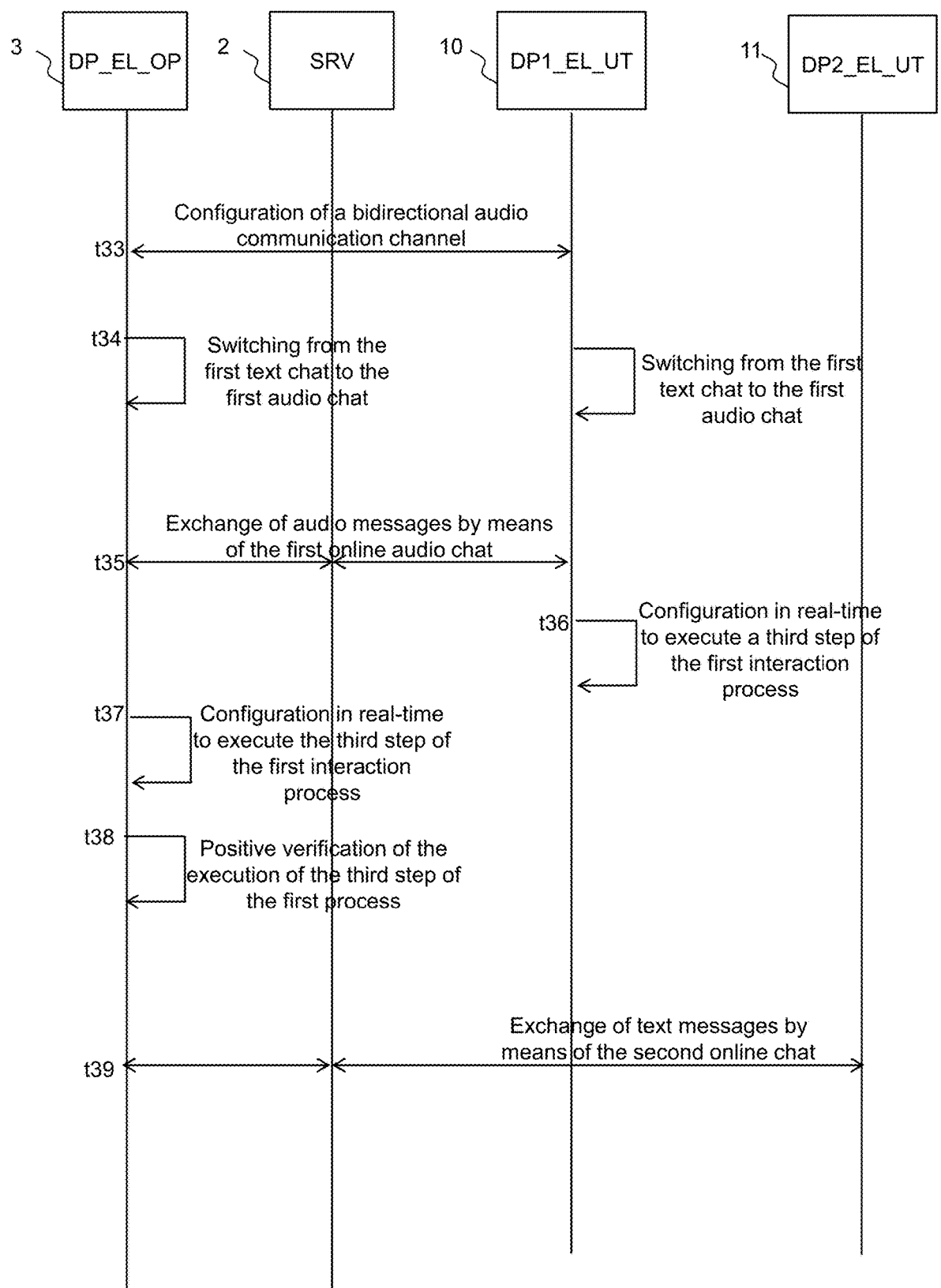
Figure 6D:
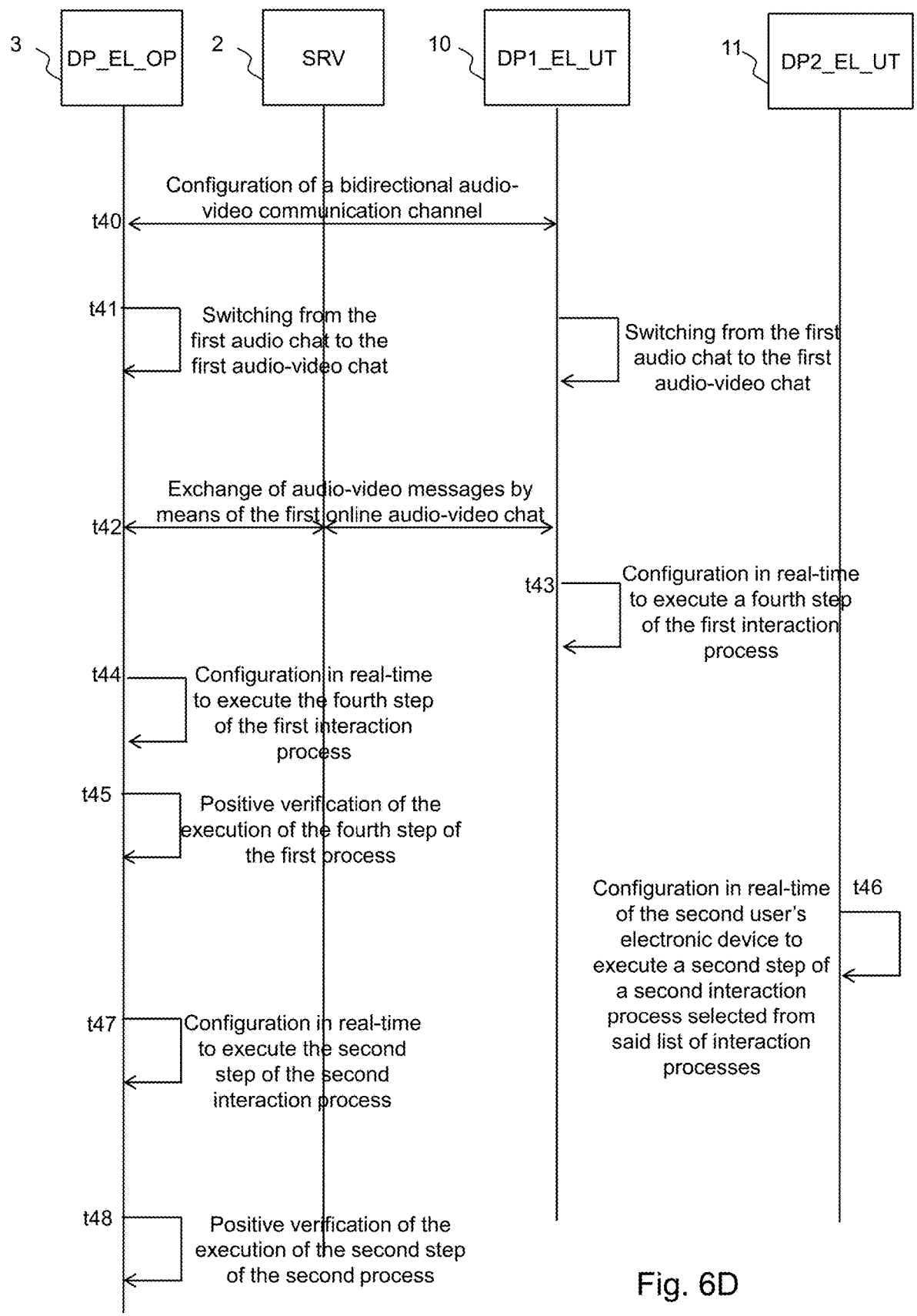
Figure 6E:
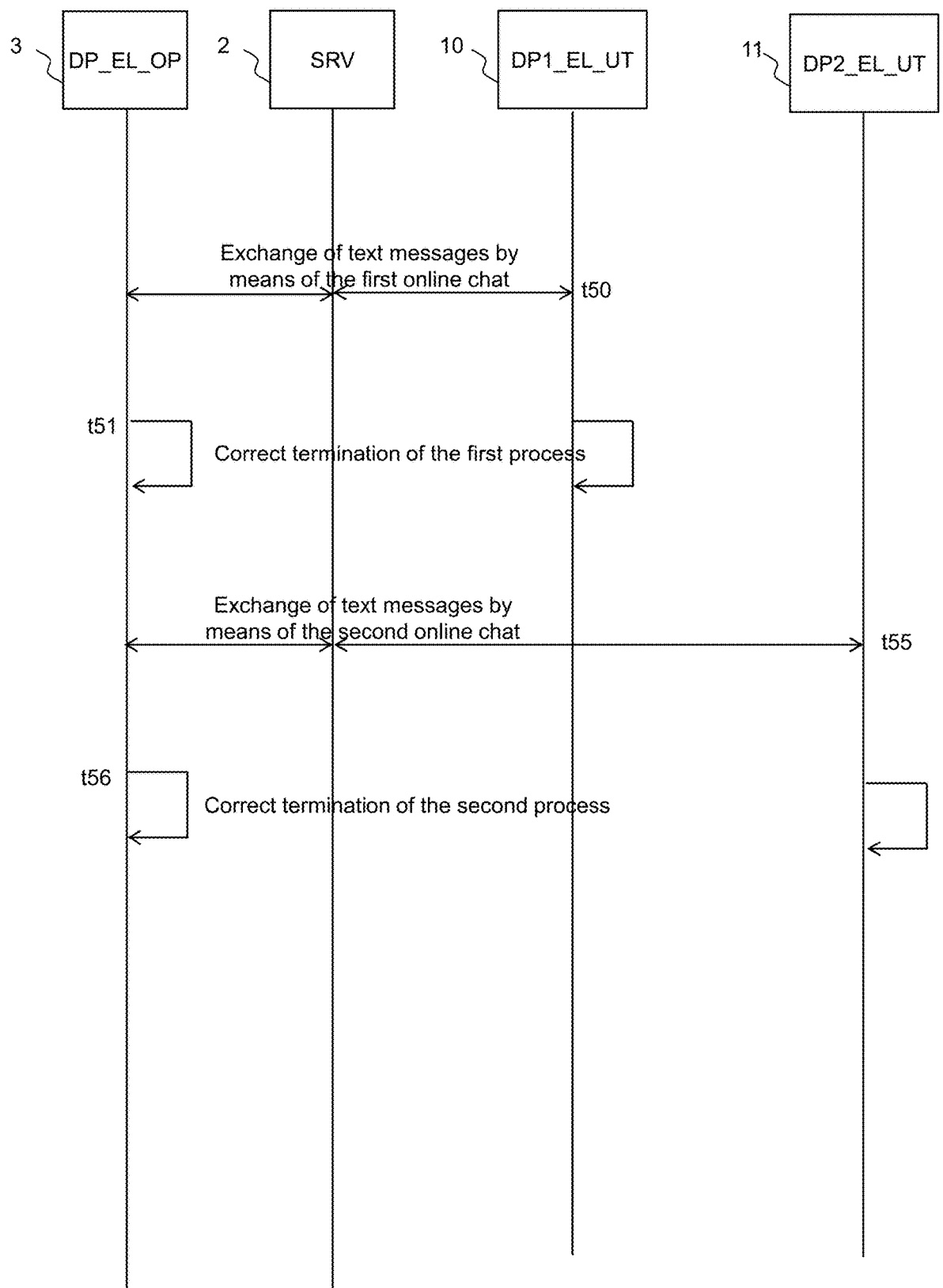

The operator' electronic device 3 is controlled by an operator 6 and it is configured to run an operator software application allowing the interaction with the user's electronic device 10, for the purpose of executing part of an interaction process implemented by means of a plurality of steps executed by means of the interaction between the user's electronic device 10 and the operator's electronic device 6 through the data communication channel, as shall be explained in further detail below with reference to the description of FIGS. 5A-5C.

Likewise, the user's electronic device 10 is controlled by a user 7 and it is configured to run a user software application allowing the interaction with the operator's electronic device 3 through the data communication channel, for the purpose of executing another part of said interaction process, as shall be explained in further detail below with reference to the description of FIGS. 5A-5C.

The term "interaction process" is understood as a procedure comprising a defined sequence of steps (i.e. a plurality of predefined steps) having the purpose of delivering a determined good or service for the remote user, in which a given step can be executed only after the preceding step has been executed, such as for example in a guided procedure.

The sequence of steps is defined in advance, for example by the client.

The use of a sequence of steps which are defined in advance (i.e. a plurality of predefined steps) provides the advantage to guide the operator to execute a procedure comprising a plurality of predefined steps, so that the operator can't deviate from the procedure, thus avoiding the risk for the operator to skip one or more steps and reducing the risk to forget the collection of important data from the user.

Moreover, the execution of all the steps of the defined sequence allows to collect, store and track data of all the states crossed by the interaction system of the disclosure, so that said data of the states can be provided later as a proof in case of a dispute by the client.

Moreover, the use of a defined sequence of steps allows to suspend the execution of the procedure at a particular step and then to recover the execution of the procedure at the step wherein the suspension occurred, also in case of different operators between the one who performed the suspension and the one who performed the recovery.

The following are some examples of procedures:
- a procedure for identifying the remote user, to issue a digital certificate associated with the remote user;
- a procedure for the remote user to enter into a distance contract;
- a procedure for the remote user to open a remote bank account.

Alternatively, the interaction process is the sharing of a resource between the operator's electronic device 3 and the user's electronic device 10 (or 11, 12), wherein said sharing allows the execution of a plurality of steps and the use of peripherals installed on the electronic devices that share said resource.

The following are some examples of a shared resource:
- sharing of a form containing fields indicating the remote user's personal data;
- sharing of a digital document;
- sharing of the same images displayed on a screen connected to the operator's electronic device and on a screen connected to the user's electronic device.

In the case of the shared form, the steps consist of the completion of the form fields by the remote user, the completion of the form fields by the operator 3, or deletion of the data entered in the fields by the remote user or the operator 3.

In the case of a shared digital document (e.g., the document is in the pdf format), the steps are for example:
- displaying a same page on the screen 3-1 of the operator's electronic device 3 and on the screen 10-1 of the user's electronic device 10 (or 11, 12),
- displaying a same portion of a page on the screen 3-1 of the operator's electronic device 3 and on the screen 10-1 of the user's electronic device 10 (or 11, 12),
- highlighting a portion of a page and displaying the highlighted portion on the screen 3-1 of the operator's electronic device 3 and on the screen 10-1 of the user's electronic device 10 (or 11, 12).

In one embodiment, the telecommunications network 4 comprises a server 2, which is an electronic device having the function of bidirectionally connecting the operator's electronic device 3 to the user's electronic device 10 and of driving the execution of the interaction processes on said operator's and user's electronic devices, by means of an architecture of client/server type.

Moreover, the operator's electronic device 3 and the user's electronic device 10 are such to exchange text messages by means of an online chat, wherein the text messages are carried through the telecommunications network 4.

Alternatively or in combination with the online chat, the operators electronic device 3 and the user's electronic device 10 are such to exchange audio messages by means of an online audio chat, wherein the audio messages are carried through said telecommunications network 4.

Alternatively or in combination with the online chat, the operators electronic device 3 and the user's electronic device 10 are such to exchange audio/video messages by means of an online audio/video chat 3-1.4, wherein the audio/video messages are carried through said telecommunications network 4.

The term "online" (with reference to a chat) is used to indicate that communication between the operator's electronic device 3 and the user's electronic device 10 by means of text messages, audio messages or audio/video messages takes place substantially in real time.

It is observed that the text, audio or audio/video messages can be exchanged through the telecommunications network 4 by means of a data communication channel that may be the same or different from the communication channel that allows the interaction between operator software application (running on the operator's electronic device 3) and the user software application (running on the user's electronic device 10).

For example, the operator's electronic device 3 and the user's electronic device 10 can consist of one of the following devices:
- a desktop personal computer;
- a laptop personal computer;
- a smartphone;
- a tablet.

Figure 2A:
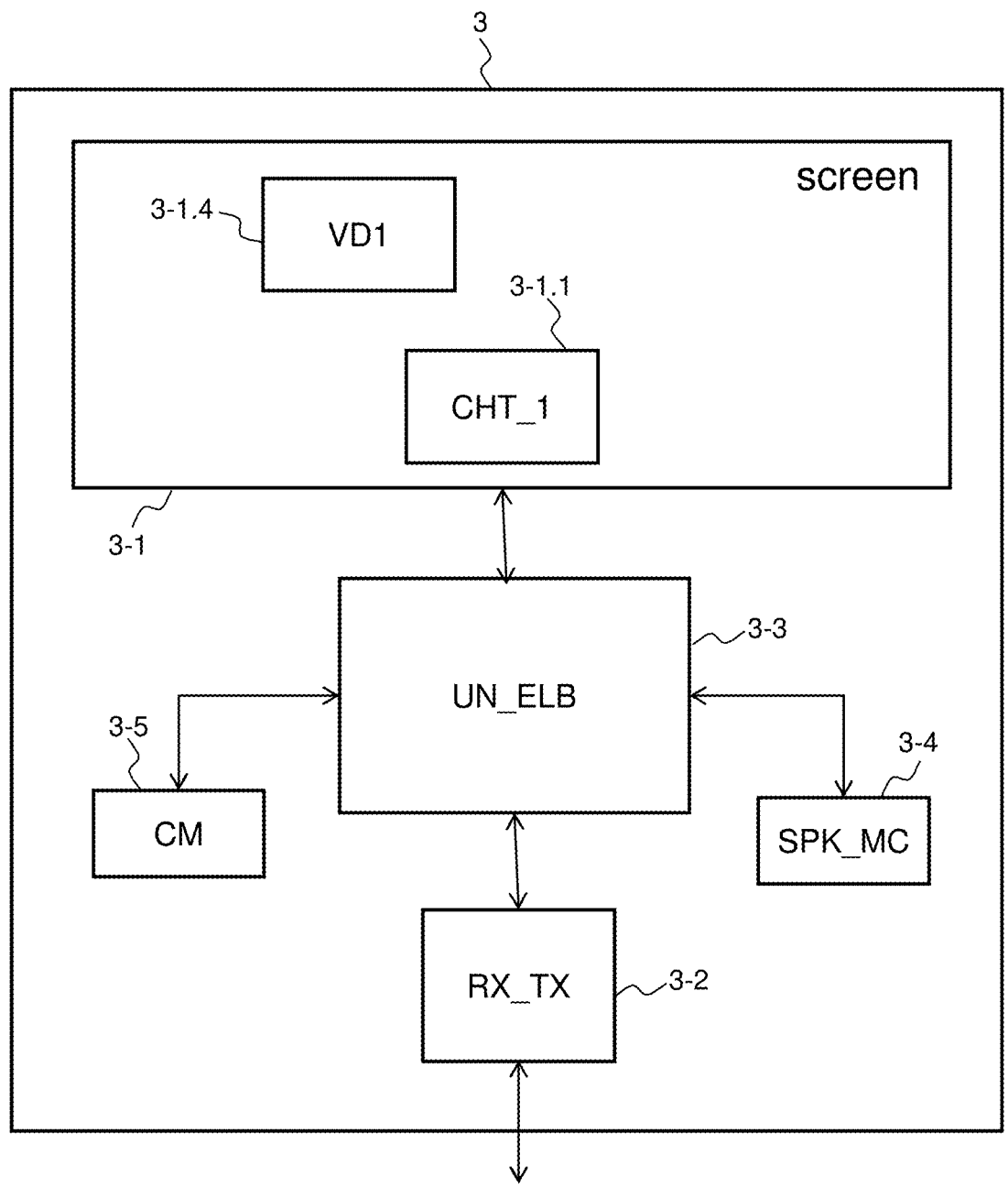
FIGS. 2A-2B show more in detail an operator's electronic device and a user's electronic device used in the electronic interaction system of FIG. 1.

With reference to FIG. 2A, it shows more in detail the operator's electronic device 3 according to the first embodiment, which comprises:
- a graphical user interface 3-1;
- a transceiver 3-2;
- a processing unit 3-3.

The transceiver 3-2 has the function of receiving/transmitting text messages, audio data and audio/video data from/to the user's electronic device 10 and the function of exchanging messages with the user's electronic device 10 for the purpose of executing part of one or more interaction processes, each one comprising a plurality of steps.

The processing unit 3-3 is electrically connected to the transceiver 3-2 and to the graphical user interface 3-1 and it has the following functions:
- processing the text messages, the audio data and audio/video data received from the transceiver 3-2;
- executing one of more interaction processes, each one comprising a plurality of steps;
- suitably driving the graphical user interface 3-1;

transmitting text messages, audio data and audio-video data to the transceiver 3-2.

The graphical user interface 3-1 allows the operator 6 to interact with the operator's electronic device 3 by means of text commands and graphical objects.

The graphical user interface 3-1 is for example a LCD or LED screen or a touchscreen.

The graphical user interface 3-1, in turn, comprises an area 3-1.1 having the function of displaying the text messages exchanged between the operator's electronic device 3 and the user's electronic device 10 by means of the text chat.

Therefore the operator's electronic device 3 communicates in real time with the user's electronic device 10 by means of the text chat.

In one embodiment, the operator's electronic device 3 further comprises an earphone (or a headset) 3-4, which comprises a microphone to acquire the voice of the operator 6 and a speaker to generate an audio signal to the operator 6: this allows to set up a voice conversation between the operator 6 and the user 7, by means of a bidirectional audio communication channel connecting the operator's electronic device 3 to the user's electronic device 10, crossing the telecommunications network 4.

In this case, it is possible to switch the communication between the operator's electronic device 3 and the first user's electronic device 10 in real time from the text chat to text and audio communication between the operator's electronic device 3 and the first user's electronic device 10; subsequently, the operator's electronic device 3 exchanges one or more messages of the text and/or audio type with the user's electronic device 10.

In one embodiment, the operator's electronic device 3 further comprises a video camera 3-5 (e.g. a webcam) having the function of acquiring in real time the images of the operator 6 connected to the operator's electronic device 3 and moreover the graphical user interface 3-1 further comprises a fourth area 3-1.4 having the function of displaying in real time images of the first user 7 connected to the user's electronic device 10: this allows to set up an audio/video session between the operator 6 and the first user 7, by means of a bidirectional audio/video communication channel connecting the operator's electronic device 3 to the user's electronic device 10, crossing the telecommunications network 4.

In this case, it is possible to perform a switch of the communication in real time between the operator's electronic device 3 and the electronic device 10 from the text chat to a text and/or audio/video chat between the operator's electronic device 3 and the first electronic device 10; subsequently, the operator's electronic device 3 exchanges one or more messages of the text and/or audio/video type with the first electronic device 10.

Figure 2B:
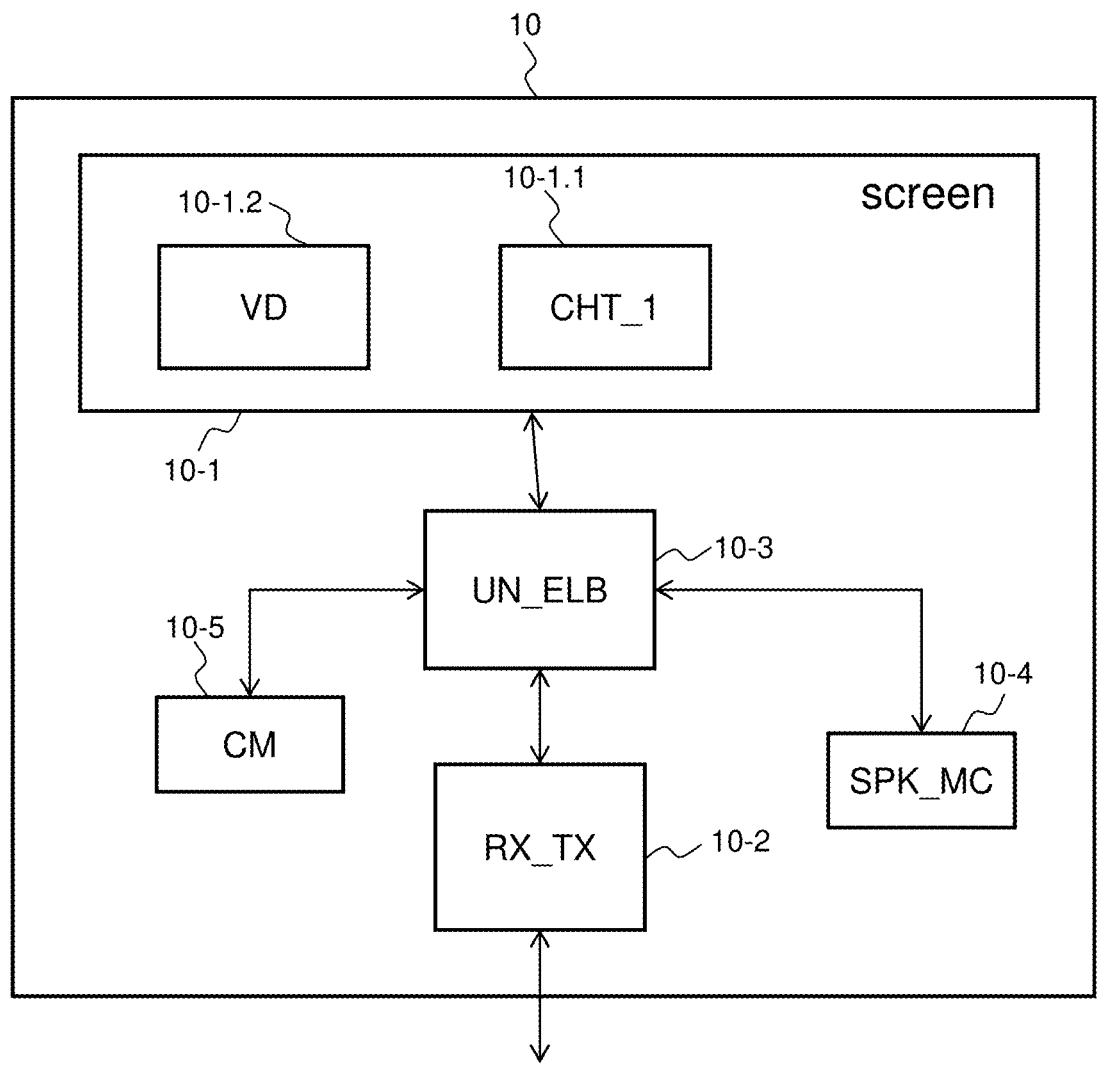

With reference to FIG. 2B, it shows more in detail the first user's electronic device 10, which comprises:

a graphical user interface 10-1;
a transceiver 10-2;
a processing unit 10-3.

The transceiver 10-2 has the function of receiving/transmitting text messages, audio data and audio/video data from/to the operator's electronic device 3 and it has the function of exchanging messages with the operator's electronic device 3 in order to execute another part of one or more interaction processes, each one comprising a plurality of steps.

The processing unit 10-3 is electrically connected to the transceiver 10-2 and to the graphical user interface 10-1 and it has the following functions:

processing the text messages, the audio and audio/video data received from the transceiver 10-2;
executing one of more interaction processes, each one comprising a plurality of steps;
suitably driving the graphical user interface 10-1;
transmitting text messages, audio data and audio/video data to the transceiver 10-2.

The graphical user interface 10-1 allows the user 7 to interact with the first user's electronic device 10 by means of text commands and graphical objects.

The graphical user interface 10-1 is for example a screen of LCD or LED type or of the touchscreen type.

The graphical user interface 10-1, in turn, comprises an area 10-1.1 having the function of displaying the text messages exchanged between the operator's electronic device 3 and the first user's electronic device 10 by means of the text chat.

Therefore the first user's electronic device 10 communicates in real time with the operator's electronic device 3 by means of the text chat.

In particular, the text messages exchanged between the user's electronic device 10 and the operator's electronic device 3 are displayed simultaneously in the area 10.1.1 of the graphical user interface 10-1 of the user's electronic device 10 and in the area 3-1.1 of the graphical user interface 3-1 of the operator's electronic device 3.

In one embodiment, the first user's electronic device 10 further comprises an earphone (or a headset) 10-4, which comprises a microphone to acquire the voice of the first user 7 and a speaker to generate an audio signal to the first user 7: this allows to set up a voice conversation between the user 7 and the operator 6, by means of a bidirectional audio communication channel connecting the user's electronic device 10 to the operator's electronic device 3, crossing the telecommunications network 4.

In one embodiment, the user's electronic device 10 further comprises a video camera 10-5 (e.g. a webcam) having the function of acquiring in real time the images of the user 7 connected to the user's electronic device 10 and moreover the graphical user interface 10-1 further comprises a second area 10-1.2 having the function of displaying in real time images of the operator 6 connected to the operator's electronic device 3: this allows to set up an audio/video session between the first user 7 and the operator 6, by means of a bidirectional audio/video communication channel connecting the first user's electronic device 10 to the operator's electronic device 3, crossing the telecommunications network 4.

Figure 3:
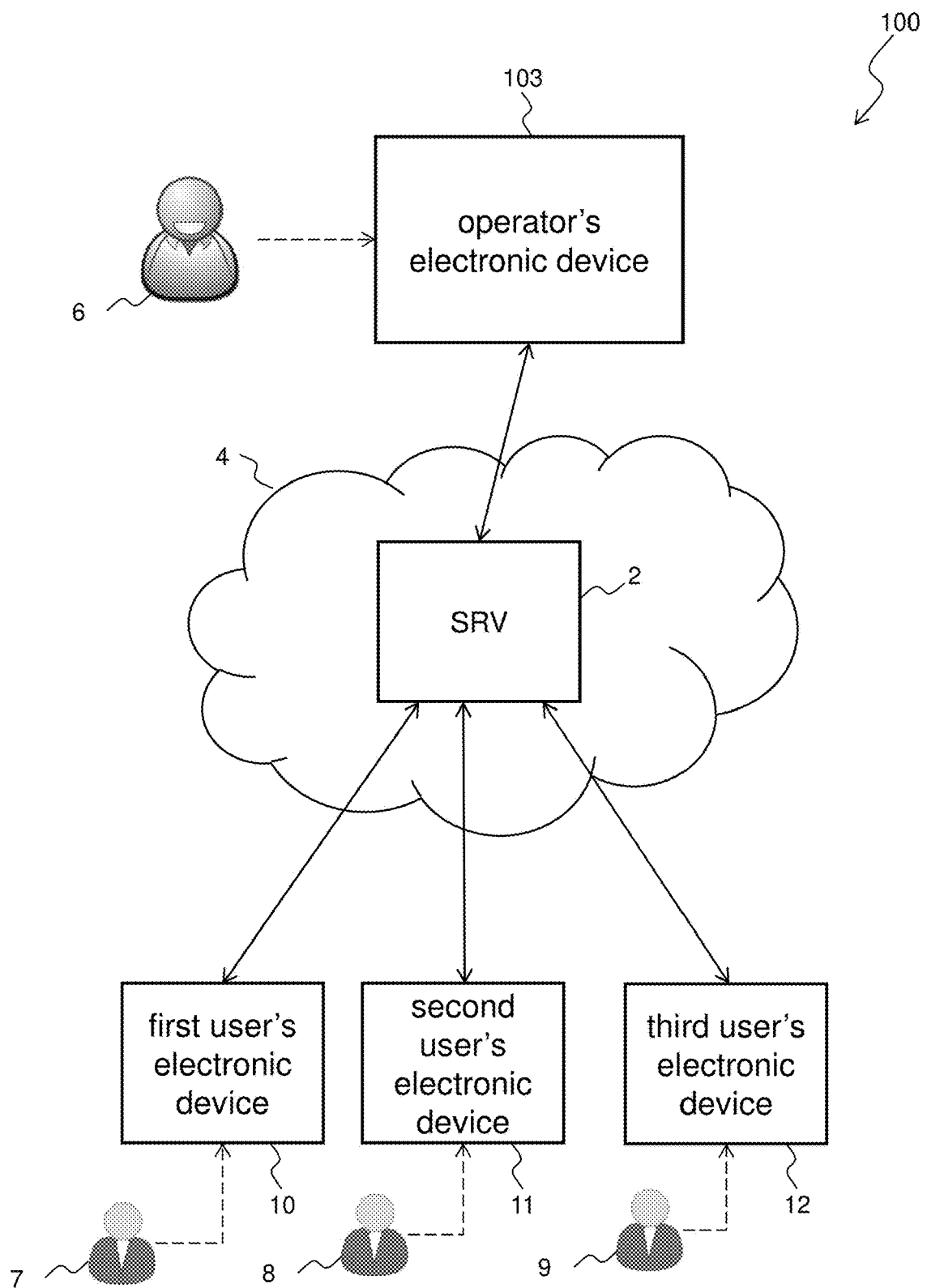
FIG. 3 is a block diagram of an electronic system for interaction between an operator's electronic device and three users' electronic devices according to a second embodiment of the disclosure.

With reference to FIG. 3, it shows a block diagram of an electronic system 100 for interaction between an operator's electronic device 3 and three users' electronic devices 10, 11, 13 according to the second embodiment of the disclosure.

The electronic system 100 of FIG. 3 differs from the electronic system 1 of FIG. 1 in that a first, a second, and a third user's electronic device 10, 11, 12 are present and controlled by a first, a second and a third user 7, 8, 9, respectively.

In this case, the operator's electronic device 3 is configured to run the operator software application allowing the interaction with the first, second and third users' electronic devices 10, 11, 12 in order to execute, alternatively:

part of a first interaction process implemented by means of a first plurality of steps executed by means of the interaction between the first user's electronic device 10 and the operator's electronic device 3 through a first data communication channel;

part of a second interaction process implemented by means of a second plurality of steps executed by means of the interaction between the second user's electronic device 11 and the operator's electronic device 3 through a second data communication channel;

part of a third interaction process implemented by means of a third plurality of steps executed by means of the interaction between the third user's electronic device 12 and the operator's electronic device 3 through a third data communication channel.

Therefore:

the first user's electronic device 10 is controlled by the first user 7 and it is configured to run a first user software application allowing the interaction with the operator's electronic device 3 through a first data communication channel, in order to execute another part of said first interaction process, as shall be explained in further detail below with reference to the description of FIGS. 6A-6E;

the second user's electronic device 11 is controlled by the second user 8 and it is configured to run a second user software application allowing the interaction with the operator's electronic device 3 through a second data communication channel, in order to execute another part of said second interaction process, as shall be explained in further detail below with reference to the description of FIGS. 6A-6E;

the third user's electronic device 12 is controlled by the third user 9 and it is configured to run a third user software application allowing the interaction with the operator's electronic device 3 through a third data communication channel, in order to execute another part of said third interaction process, as shall be explained in further detail below with reference to the description of FIGS. 6A-6E.

Furthermore, the operators electronic device 4 is configured to:

exchange text messages with the first user's electronic device 10 by means of a first online chat;

exchange text messages with the second user's electronic device 11 by means of a second online chat;

exchange text messages with the third user's electronic device 12 by means of a third online chat, wherein the text messages are carried through the telecommunications network 4.

The first, second and third text chats are independent of each other, that is:

the text messages exchanged between the first user 7 and the operator 6 by means of the first chat are displayed only within the first chat, whereas they are not displayed in the second and third chats;

the text messages exchanged between the second user 8 and the operator 10-1 by means of the second chat are displayed only within the second chat, whereas they are not displayed in the first and third chats;

the text messages exchanged between the third user 9 and the operator 10-1 by means of the third chat are displayed only within the third chat, whereas they are not displayed in the first and second chats.

Alternatively or in combination with the online chats, the operator's electronic device 3 is configured to exchange audio messages with the first, second, third users' electronic devices 10, 11, 12 by means of a first, second, and third online audio chat, respectively, which are independent of each other, and wherein the audio messages are carried through said telecommunications network 4.

Alternatively or in combination with the online chats, the operators electronic device 3 is configured to exchange audio/video messages with the first, second, third users' electronic devices 10, 11, 12 by means of a first, second, third online audio/video chat 3-1.4, 3-1.5, 3-1.6, respectively, which are independent of each other, wherein the audio/video messages are carried through said telecommunications network 4.

Figure 4A:
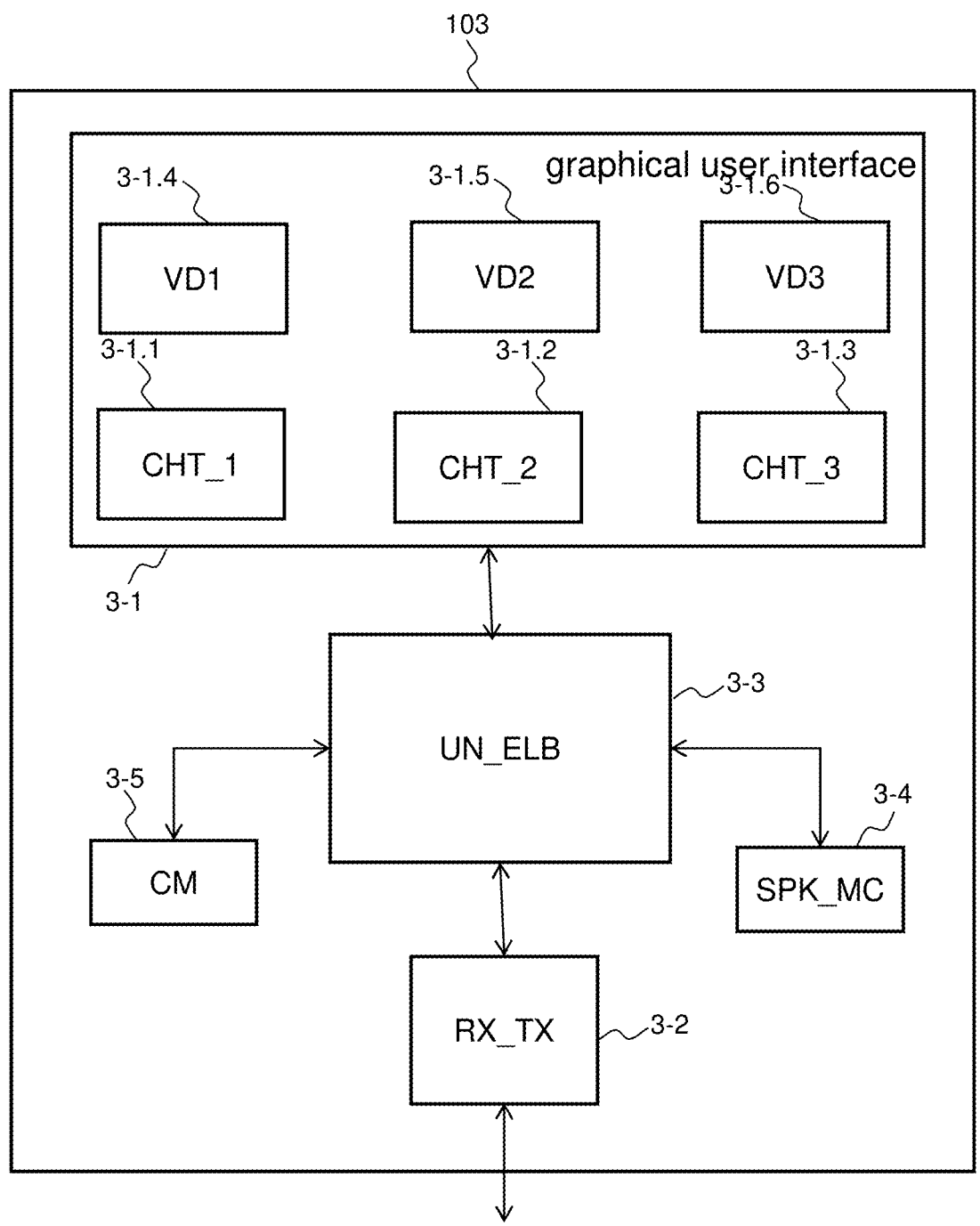
FIGS. 4A-4B show more in detail an operator's electronic device and two users' electronic devices used in the electronic interaction system of FIG. 3.

With reference to FIG. 4A, it shows more in detail the operator's electronic device 103 according to the second embodiment.

The operator's electronic device 103 differs from the operator's electronic device 3 of FIG. 2A of the first embodiment in that the transceiver 3-2 of the operator's electronic device 103 has the following functions:

receiving/transmitting text messages, audio data and audio/video data from/to the first, second, and third users' electronic devices 10, 11, 12;

exchanging messages with the first user's electronic device 10 in order to execute part of one or more first interaction processes, each one comprising a plurality of steps;

exchanging messages with the second user's electronic device 11 in order to execute part of one or more second interaction processes, each one comprising a plurality of steps;

exchanging messages with the third user's electronic device 12 in order to execute part of one or more third interaction processes, each one comprising a plurality of steps.

Moreover, the operator's electronic device 103 differs from the operator's electronic device 3 of the first embodiment as shown in FIG. 2A in that the processing unit 3-3 has the following functions:

processing the text messages and the audio and audio/video data received from the transceiver 3-2;

executing one of more first interaction processes, each one comprising a plurality of steps;

executing one of more second interaction processes, each one comprising a plurality of steps;

executing one of more third interaction processes, each one comprising a plurality of steps;

suitably driving the graphical user interface 3-1;

transmitting text messages, audio data and audio/video data to the transceiver 3-2.

Moreover, the graphical user interface 3-1 of the operator's electronic device 103 further comprises:

a second area 3-1.2 having the function of displaying the text messages exchanged between the operator's electronic device 3 and the second user's electronic device 11 by means of the second text chat;

a third area 3-1.3 having the function of displaying the text messages exchanged between the operator's electronic device 3 and the third user's electronic device 12 by means of the third text chat.

Therefore the operator's electronic device 3 communicates in real time, alternatively, with the first, second, third electronic device 10, 11, 13 by means of the first, second, third online text chat, respectively, which may all be active simultaneously.

In one embodiment, by means of the earphone (or headset) 3-4, the operator can set up a voice conversation, alternatively, with the first, second, third user 7, 8, 9, by means of a first, second, third bidirectional audio communication channel, respectively, all of which are simultaneously active, and wherein the first, second and third bidirectional audio communication channel connect the operator's electronic device 3 to the first, second and third users' electronic devices 10, 11, 12, respectively, crossing the telecommunications network 4.

In this case it is possible to perform:

a switch of the communication in real time between the operator's electronic device 3 and the first electronic device 10 from the first text chat to a first text and/or audio chat between the operator's electronic device 3 and the first electronic device 10, and subsequently the operator's electronic device 3 exchanges one or more messages of a text and/or audio type with the first electronic device 10;

a switch of the communication in real time between the operator's electronic device 3 and the second electronic device 11 from the second text chat to a second text and/or audio chat between the operator's electronic device 3 and the second electronic device 11, and subsequently the operator's electronic device 3 exchanges one or more messages of a text and/or audio type with the second electronic device 11;

a switch the communication in real time between the operator's electronic device 3 and the third electronic device 12 from the third text chat to a third text and/or audio chat between the operator's electronic device 3 and the third electronic device 12, and subsequently the operator's electronic device 3 exchanges one or more messages of a text and/or audio type with the third electronic device 12.

In one embodiment, by means of the video camera 3-5, images of the operator 6 connected to the operator's electronic device 3 are acquired in real time and further the fourth area 3-1.4 of the graphical user interface 3-1 has the function of displaying, alternatively, images in real time of the first, second, third user 7, 8, 9 connected to the users' electronic devices 10, 11, 12: this allows to set up an audio-video session between the operator 6 and the first, second, third user 7, 8, 9, alternatively, by means of a first, second, third bidirectional audio/video communication channel, respectively, all of which are simultaneously active, and wherein the first, second, third bidirectional audio/video communication channel connect the operator's electronic device 3 to the first, second, third users' electronic devices 10, 11, 12, respectively, crossing the telecommunications network 4.

In this case it is possible to perform:

a switch of the communication in real time between the operator's electronic device 3 and the first electronic device 10 from the first text (or audio) chat to a first text and/or audio/video chat between the operator's electronic device 3 and the first electronic device 10, and subsequently the operator's electronic device 3 exchanges one or more messages of a text and/or audio/video type with the first electronic device 10;

a switch of the communication in real time between the operator's electronic device 3 and the second electronic device 11 from the second text (or audio) chat to a second text and/or audio/video chat between the operator's electronic device 3 and the second electronic device 11, and subsequently the operator's electronic device 3 exchanges one or more messages of a text and/or audio/video type with the second electronic device 11;

a switch of the communication in real time between the operator's electronic device 3 and the third electronic device 12 from the third text (or audio) chat to a third text and/or audio/video chat between the operator's electronic device 3 and the third electronic device 12, and subsequently the operator's electronic device 3 exchanges one or more messages of a text and/or audio/video type with the third electronic device 12.

Figure 4B:
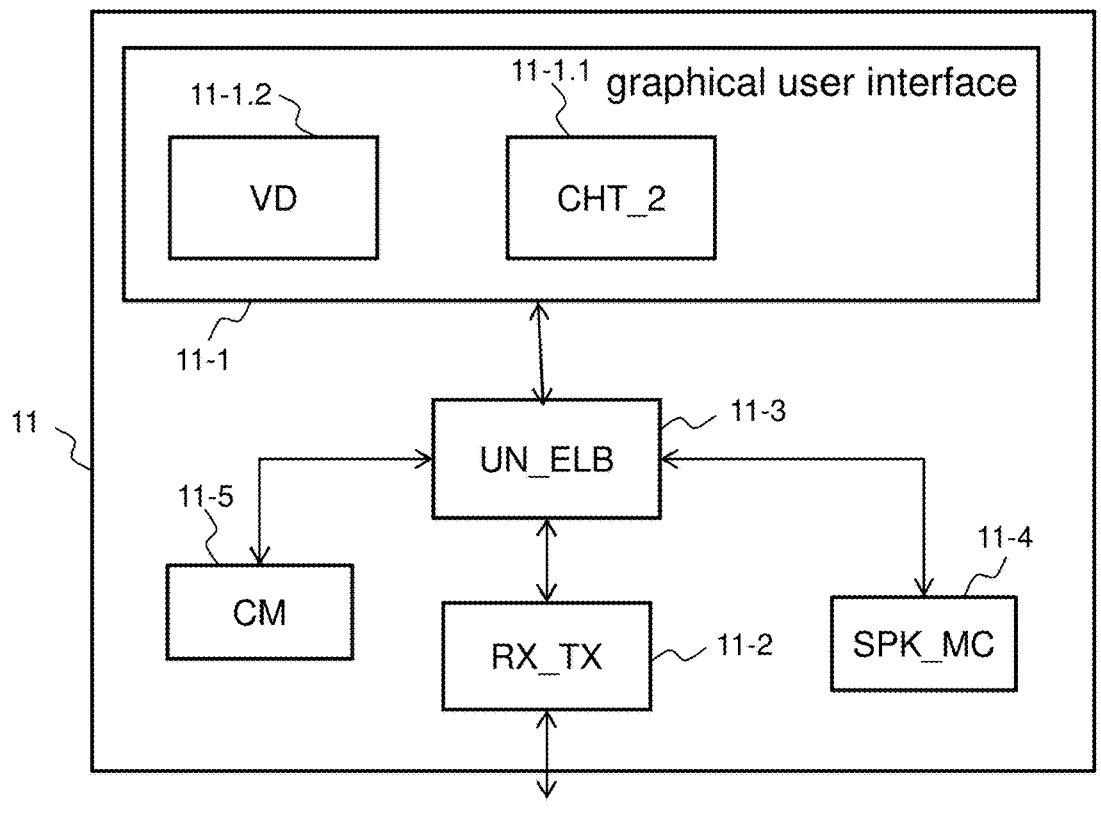
Figure 4B:
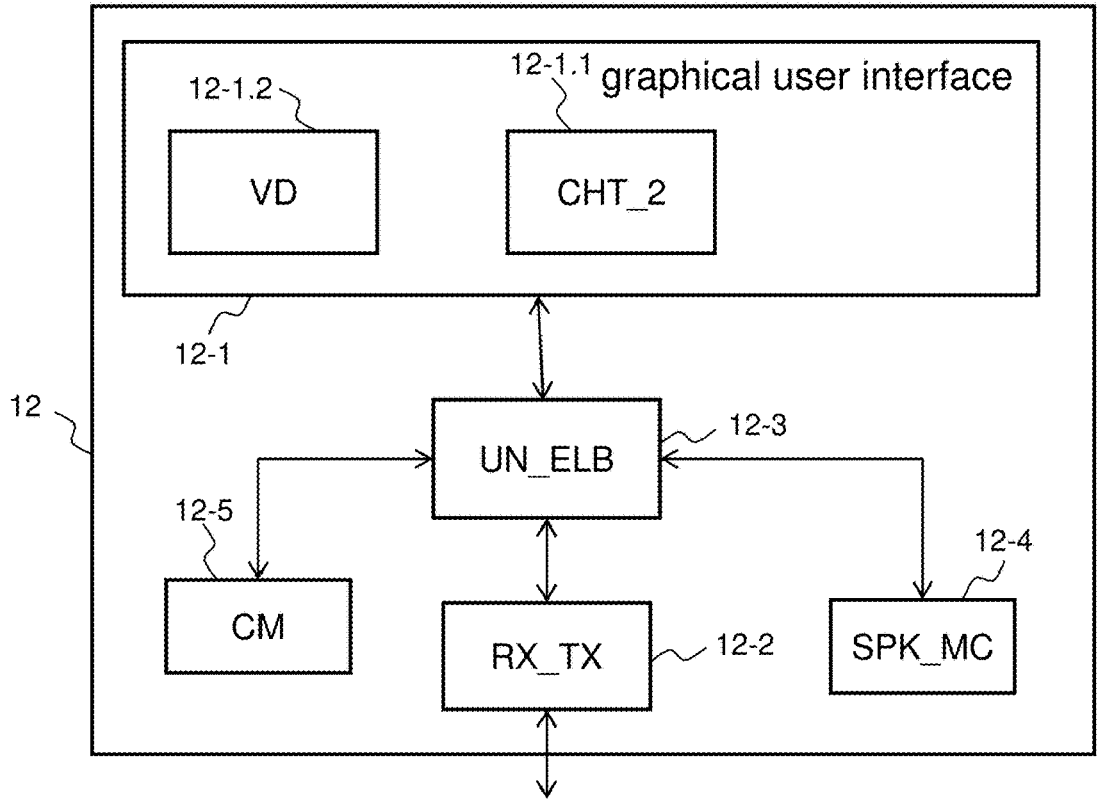

With reference to FIG. 4B, it shows more in detail the second user's electronic device 11 and the third user's electronic device 12.

The previous considerations concerning the user's electronic device 10 are applicable in a similar manner to the second and third users' devices 11, 12, substituting the graphical user interface 10-1 with 11-1 and 12-1, the transceiver 10-2 with 11-2 and 12-2 and the processing unit 10-3 with 11-3 and 12-3.

In particular:

the text messages exchanged between the second user's electronic device 11 and the operator's electronic device 3 by means of the second text chat are simultaneously displayed in the first area 11-1.1 of the graphical user interface 11-1 of the second user's electronic device 11 and in the second area 3-1.2 of the graphical user interface 3-1 of the operator's electronic device 3;

part of the second interaction process is executed on the second user's electronic device 11;

in particular, it is possible to set up a voice conversation between the second user 8 and the operator 6, by means of a bidirectional audio communication channel connecting the second user's device 11 to the operator's electronic device 3, crossing the telecommunications network 4;

in particular, the graphical user interface 11-1 of the second user's electronic device 11 further comprises a second area 11-1.2 having the function of displaying a video of the image in real time of the operator 6 and it is possible to set up an audio/video session between the second user 8 and the operator 6, by means of a bidirectional audio/video communication channel connecting the second user's electronic device 11 to the operator's electronic device 3, crossing the telecommunications network 4;

the text messages exchanged between the third user's electronic device 12 and the operator's electronic device 3 by means of the third text chat are displayed simultaneously in the first area 12.1.1 of the graphical user interface 12-1 of the third user's electronic device 12 and in the third area 3-1.3 of the graphical user interface 3-1 of the operator's electronic device 3;

part of the third interaction process is executed on the third user's electronic device 12;

in particular, it is possible to set up a voice conversation between the third user 9 and the operator 6, by means of a bidirectional audio communication channel connecting the third user's device 12 to the operator's electronic device 3, crossing the telecommunications network 4;

in particular, the graphical user interface 12-1 of the third user's electronic device 12 further comprises a second area 12-1.2 having the function of displaying a video of the image in real time of the operator 6 and it is possible to set up an audio/video session between the third user 9 and the operator 6, by means of a bidirectional audio/video communication channel connecting the third user's electronic device 12 to the operator's electronic device 3, crossing the telecommunications network 4.

With reference to FIGS. 5A-5C, they show a timing diagram of the method of interaction between an operator 6 and a remote user 7 according to the second embodiment of the disclosure.

It is possible to observe the following operation:

- between times t1 and t3 there is an initial configuration phase, followed by the phase of real operation of the interaction system 1;
- at time t5 there is a welcome phase in which the operator 6 and the remote user 7 exchange welcome text messages, by means of the text chat;
- between times t10 and t15, it is executed the first step of the interaction process (for example, the interaction process is a guided procedure for remote signing of a contract by the remote user 7 and the first step is for example a confirmation to the video recording by the remote user 7);
- between times t20 and t22, it is executed the second step of the interaction process (in the considered example, the second step is for example the filling of a form with the user's personal data);
- between the times t33 and t35, it occurs a switch from the text chat to an audio chat and the operator 3 has an audio conversation with the remote user 7;
- between the times t36 and t38, it is executed the third step of the interaction process (in the considered example, the third step is for example the sharing of the contract in a digital format);
- between the times t40 and t42, it occurs a switch from the audio chat to an audio-video chat and the operator 3 has a video call with the remote user 7;
- between the times t43 and t45, it is executed the fourth (and last) step of the interaction process (in the considered example, the fourth step is for example the declaration of acceptance of the contract conditions by the remote user 7);
- at the time t50, the operator 6 and the remote user 7 exchange closing text messages, by means of the text chat;
- at the time t51, the interaction process ends.

With reference to FIGS. 6A-6E, they show a timing diagram of the method of interaction between an operator and two remote users according to the second embodiment of the disclosure.

It is possible to observe the following operation:

- between the times t1 and t4, there is an initial configuration phase, followed by the phase of real operation of the interaction system 1;
- at the time t5 there is a welcome phase in which the operator 6 and the first remote user 7 exchange welcome text messages, by means of the first text chat;
- at the time t6 there is a welcome phase in which the operator 6 and the second remote user 8 exchange welcome text messages, by means of the second text chat;
- between the times t10 and t15, it is executed the first step of the first interaction process between the operator 6 and the first remote user 7;
- between the times t20 and t22, it is executed the second step of the interaction process;
- between the times t25 and t26, it is executed the first step of the second interaction process between the operator 6 and the second remote user 7;
- between the times t33 and t35, it occurs a switch from the text chat to an audio chat and the operator 3 has an audio conversation with the remote user 7;
- between the times t36 and t38, it is executed the third step of the interaction process (in the considered example, the third step is for example the sharing of the contract in a digital format);
- between the times t40 and t42, it occurs a switch from the audio chat to an audio-video chat and the operator 3 has a video call with the remote user 7;
- between the times t43 and t45, it is executed the fourth (and last) step of the interaction process;
- between the times t46 and t48, it is executed the second step of the second interaction process between the operator 6 and the second remote user 7;
- at the time t50, the operator 6 and the first remote user 7 exchange closing text messages, by means of the first text chat;
- at the time t51 the first interaction process ends.
- at the time t55 the operator 6 and the second remote user 8 exchange closing text messages, by means of the second text chat;
- at the time t56 the second interaction process ends.

In one embodiment, the interaction process is a guided procedure for remote signing of a contract by the remote user 7 and it comprises the following steps:

- a first step in which the operator exchanges welcome messages of a text type (or exchanges welcome messages of an audio or audio/video type) with the remote user;
- a second step confirming video recording of the procedure;
- a third step in which the remote user states the date and current time;
- a fourth step in which the remote user fills a form with the user's personal data;
- a fifth step in which a digital copy of the user's identification document is acquired;
- a sixth step in which the contract in a digital format is shared;
- a seventh step in which the remote user declares acceptance of the contract conditions;
- an eighth step for verifying the remote user's electronic mail box;
- a ninth step for verifying the remote user's mobile phone number.

It is noted that for the purposes of explaining the disclosure, three users 10, 11, 12 are considered in FIGS. 3 and 4B, but more in general the number of users is greater than or equal to two and similar considerations apply.

The invention claimed is:

1. A method implemented using at least one computer for remote interaction between at least one operator and at least one user, the method comprising the steps of:
    a) configuring, on a user's electronic device, a list of interaction processes, wherein each one of said interaction processes is implemented by a defined sequence of a plurality of steps executed during an interaction between the user's electronic device and an operator's electronic device through a data communication channel of a telecommunications network, wherein said sequence of a plurality of steps is defined in advance and wherein a number and an order of the plurality of steps are defined in advance;
    b) bidirectionally connecting the user's electronic device to the operator's electronic device through said data communication channel through the telecommunications network;
    c) exchanging text messages between the operator's electronic device and the user's electronic device by an online chat and/or exchanging audio or audio/video messages by an online audio or audio/video chat, wherein the text and/or audio or audio/video messages are carried through said telecommunications network;
d) configuring, in real-time, the user's electronic device to execute a step of an interaction process selected from said list of interaction processes;
e) configuring, in real-time, the operator's electronic device to execute said step of the selected interaction process;
f) verifying whether the step of the selected interaction process has been executed by the user's electronic device;
g) in a case of a positive verification, approving the step of the selected interaction process and repeating steps d), e), f), g) for at least one further step of the selected interaction process;
h) in a case of a negative verification, waiting for execution of the step of the selected interaction process and returning to step f).

2. The method according to claim 1, wherein the interaction includes an interaction between an operator and a plurality of remote users, wherein:
step a) comprises configuring, on a plurality of users' electronic devices, a respective list of interaction processes, wherein each one of said interaction processes is implemented by a defined sequence of a plurality of steps executed during the interaction between the respective users' electronic devices and the operator's electronic device through the data communication channel of the telecommunications network, wherein each said sequence of a plurality of steps is defined in advance and wherein a number and an order of the plurality of steps are defined in advance;
step b) comprises bidirectionally connecting the plurality of users' electronic devices to the operator's electronic device using a respective plurality of data communication channels through the telecommunications network;
step c) comprises exchanging text messages between the operator's electronic device and the plurality of users' electronic devices by a corresponding plurality of online chats which are independent of each other, and/or exchanging audio or audio/video messages by a corresponding plurality of online audio or audio/video chats which are independent of each other, wherein the text and/or audio or audio/video messages are carried through said telecommunications network;
step d) further comprises selecting a first user's electronic device out of the plurality of users' electronic devices and configuring in real-time the first user's electronic device to execute a step of a first interaction process selected from the respective list of interaction processes;
step e) comprises configuring in real-time the operator's electronic device to execute said step of the first interaction process;
step f) comprises verifying whether the step of the first interaction process has been executed by means of the first user's electronic device;
step g) comprises, in the case of a positive verification, approving the step of the first interaction process and repeating steps d), e), f), g) for at least one further step of the first interaction process;
step h) comprises, in the case of a negative verification, waiting for execution of the step of the first interaction process and returning to f).

3. The method according to claim 2, wherein:
step a) comprises configuring, on the first and a second user's electronic device selected from the plurality of users' electronic devices, a first and a second list of interaction processes, respectively, wherein each process on the first list of the interaction processes is implemented by a defined sequence of a first plurality of steps executed during the interaction between the first user's electronic device and the operator's electronic device through the telecommunications network and wherein each process on the second list of the interaction processes is implemented by a defined sequence of a second plurality of steps executed during the interaction between the second user's electronic device and the operator's electronic device through the telecommunications network,
step b) comprises bidirectionally connecting the first user's electronic device and the second user's electronic device to the operator's electronic device by a first and a second data communication channel, respectively, through the telecommunications network,
step c) comprises:
exchanging text messages between the operator's electronic device and the first user's electronic device by a first online chat and/or exchanging audio or audio/video messages by a first online audio or audio/video chat, wherein the text and/or audio or audio/video messages are carried through said telecommunications network;
exchanging text messages between the operator's electronic device and the second user's electronic device by a second online chat which is independent of the first online chat, and/or exchanging audio or audio/video messages by a second online audio or audio/video chat which is independent of the first online audio or audio/video chat, wherein the text messages and/or audio or audio/video messages are carried through said telecommunications network;
the method further comprising the steps of:
d1) selecting a second user's electronic device from the plurality of users' electronic devices and configuring in real-time the second user's electronic device to execute a step of a second interaction process selected from the second list of interaction processes, wherein the second process is independent of the first process;
e1) further configuring in real-time the operator's electronic device to execute said step of the second interaction process;
f1) verifying whether the step of the second interaction process has been executed by means of the second user's electronic device;
g1) in a case of a positive verification, approving said step of the second interaction process and repeating steps d1), e1), f1), g1) for at least one further step of the second interaction process;
h1) in a case of a negative verification, waiting for execution of the step of the second interaction process and returning to step f1) for verification of the execution of the step of the second process.

4. The method according to claim 3, further comprising the steps of:
setting up a common communication channel between the operator's electronic device and the first and the second user's electronic device;

merging the first and the second online chat into a common online chat and/or merging the first and the second audio or audio/video chat into a common online audio or audio/video chat;

exchanging text messages between the operator's electronic device and the first and second user's electronic device by the common online chat and/or exchanging audio or audio/video messages by the common online audio or audio/video chat.

5. The method according to claim 4, further comprising the steps of:

sharing, between the first and the second user's electronic device, the first or the second interaction process in a shared interaction process;

configuring in real-time the first and the second user's electronic device to execute a step of the shared interaction process;

further configuring the operator's electronic device to execute the step of the shared interaction process;

verifying whether a step of the shared interaction process has been executed by means of the first and/or second user's electronic device;

in a case of a positive verification, approving said step of the shared interaction process and repeating said configurations and verification for at least one further step of the shared interaction process;

in a case of a negative verification, waiting for execution of the step of the shared interaction process and returning to the verification.

6. The method according to claim 1, wherein the selected interaction process is a sharing of a resource between the user's electronic device and the operator's electronic device by means of the data communication channel, wherein the shared resource is selected from the following list:

a shared form containing fields indicating the user's personal data;

sharing of a digital document;

sharing of the same images displayed on a screen connected to the operator's electronic device and on a screen connected to the user's electronic device.

7. The method according to claim 2, wherein the interaction includes an interaction between a first plurality of operators and a second plurality of remote users, the method further comprising, between steps a) and b), the step of:

receiving a call from the first user's electronic device and routing the call to a first operator's electronic device according to at least one preconfigured rule.

8. The method according to claim 1, wherein the interaction process is a procedure comprising a defined sequence of steps, said procedure being selected from the following list:

a procedure for identifying the remote user, to issue a digital certificate associated to the remote user;

a procedure for the remote user to enter into a distance contract;

a procedure for the remote user to open a remote bank account.

9. A non-transitory computer readable medium having a program recorded thereon, said program comprising computer executable instructions configured to perform the steps b)-h) of claim 1, when said computer executable instructions are run on at least one computer.

10. An electronic system for interaction between at least one operator and at least one remote user, the system comprising:

an operator's electronic device controlled by an operator;

a user's electronic device controlled by a remote user;

a telecommunications network configured to bidirectionally connect the user's electronic device to the operator's electronic device by a data communication channel;

a memory to store a list of interaction processes, wherein each one of said interaction processes is implemented by a defined sequence of a plurality of steps executed during the interaction between the user's electronic device and the operator's electronic device through the data communication channel of the telecommunications network, wherein said sequence of a plurality of steps is defined in advance and wherein a number and an order of the plurality of steps are defined in advance;

wherein the operator's electronic device and the user's electronic device are configured to exchange text messages by an online chat and/or to exchange audio or audio/video messages by an online audio or audio/video chat, wherein the text and/or audio or audio/video messages are carried through said telecommunications network, wherein the user's electronic device is configured to:

configure itself in real time to execute a step of an interaction process selected from said list of interaction processes;

and wherein the operator's electronic device is configured to:

configure itself in real time to execute said step of the selected interaction process;

verify whether the step of the selected interaction process has been executed by means of the user's electronic device;

in a case of a positive verification, approve said step of the selected interaction process and repeat said configuration and verification for at least one further step of the selected interaction process;

in a case of a negative verification, wait for execution of said step of the interaction process and repeat said verification.

11. The system according to claim 10, wherein the interaction includes an interaction between the operator and a plurality of remote users, the system comprising:

a plurality of users' electronic devices controlled by a respective plurality of remote users, a memory to store a list of interaction processes, wherein each one of said interaction processes is implemented by a defined sequence of a plurality of steps executed during the interaction between the respective user's electronic device and the operator's electronic device through the telecommunications network, wherein:

each sequence of a plurality of steps is defined in advance and wherein a number and an order of the plurality of steps are defined in advance;

the plurality of users' electronic devices are bidirectionally connected to the operator's electronic device through a respective plurality of data communication channels through the telecommunications network;

the operator's electronic device and the plurality of users' electronic devices are configured to exchange text messages by respective online chats and/or to exchange audio or audio/video messages by respective online audio or audio/video chats, wherein the text and/or audio or audio/video messages are carried through said telecommunications network;

wherein a first user's electronic device, selected from the plurality of users' electronic devices, is configured to:

configure itself in real time to execute a step of a first interaction process selected from the respective list of interaction processes;

and wherein the operator's electronic device is configured to:

configure itself in real time to execute said step of the first interaction process;

verify whether the step of the first interaction process has been executed by means of the first user's electronic device;

in the case of a positive verification, approve said step of the first interaction process and repeat said configuration and verification for at least one further step of the first interaction process;

in the case of a negative verification, wait for execution of said step of the first interaction process and repeat said verification.

12. The system according to claim 10, wherein the network further comprises a server interposed between the user's electronic device and the operator's electronic device, wherein said data communication channel crosses the server, the server being configured to execute the step of the selected interaction process.

13. The system according to claim 10, wherein the operator's electronic device and the users' electronic devices are selected from the following:
a desktop personal computer;
a laptop personal computer;
a smartphone;
a tablet.

14. The method according to claim 1 the interaction including an interaction between an operator and a plurality of remote users, wherein:

step a) comprises configuring, on a plurality of users' electronic devices, a respective list of interaction processes, wherein each one of said interaction processes is implemented by a defined sequence of a plurality of steps executed during the interaction between the respective users' electronic devices and the operator's electronic device through a data communication channel of the telecommunications network;

step b) comprises bidirectionally connecting the plurality of users' electronic devices to the operator's electronic device by a respective plurality of data communication channels through the telecommunications network;

step c) comprises exchanging text messages between the operator's electronic device and the plurality of users' electronic devices by f a corresponding plurality of online chats which are independent of each other, and/or exchanging audio or audio/video messages by a corresponding plurality of online audio or audio/video chats which are independent of each other, wherein the text and/or audio or audio/video messages are carried through said telecommunications network;

step d) further comprises selecting a first user's electronic device out of the plurality of users' electronic devices and configuring in real-time the first user's electronic device to execute a step of a first interaction process selected from the respective list of interaction processes;

step e) comprises configuring in real-time the operator's electronic device to execute said step of the first interaction process;

step f) comprises verifying whether the step of the first interaction process has been executed by means of the first user's electronic device;

step g) comprises, in the case of a positive verification, approving the step of the first interaction process and repeating steps d), e), f), g) for at least one further step of the first interaction process;

step h) comprises, in the case of a negative verification, waiting for execution of the step of the first interaction process and returning to f).

15. The method according to claim 14, wherein:

step a) comprises configuring, on the first and a second user's electronic device selected from the plurality of users' electronic devices, a first and second list of interaction processes, respectively, wherein each process on the first list of the interaction processes is implemented by a defined sequence of a first plurality of steps executed by means of the interaction between the first user's electronic device and the operator's electronic device through the telecommunications network and wherein each process on the second list of the interaction processes is implemented by a defined sequence of a second plurality of steps executed during the interaction between the second user's electronic device and the operator's electronic device through the telecommunications network, step b) comprises bidirectionally connecting the first and the second users' electronic devices to the operator's electronic device through a first and a second data communication channel, respectively, through the telecommunications network, step c) comprises:

exchanging text messages between the operator's electronic device and the first user's electronic device by a first online chat and/or exchanging audio or audio/video messages by a first online audio or audio/video chat, wherein the text and/or audio or audio/video messages are carried through said telecommunications network;

exchanging text messages between the operator's electronic device and the second user's electronic device by a second online chat which is independent of the first online chat, and/or exchanging audio or audio/video messages by a second online audio or audio/video chat which is independent of the first online audio or audio/video chat, wherein the text messages and/or audio or audio/video messages are carried through said telecommunications network;

the method further comprising the steps of:

d1) selecting a second user's electronic device from the plurality of users' electronic devices and configuring in real-time the second user's electronic device to execute a step of a second interaction process selected from the second list of interaction processes, wherein the second process is independent of the first process;

e1) further configuring in real-time the operator's electronic device to execute said step of the second interaction process;

f1) verifying whether the step of the second interaction process has been executed by means of the second user's electronic device;

g1) in the case of a positive verification, approving said step of the second interaction process and repeating steps d1), e1), f1), g1) for at least one further step of the second interaction process;

h1) in the case of a negative verification, waiting for execution of the step of the second interaction process and returning to step f1) for verification of the execution of the step of the second process.

16. The method according to claim 15, further comprising the steps of:
- setting up a common communication channel between the operator's electronic device and the first and the second user's electronic device;
- merging the first and the second online chat into a common online chat and/or merging the first and the second audio or audio/video chat into a common online audio or audio/video chat;
- exchanging text messages between the operator's electronic device and the first and second user's electronic device by means of the common online chat and/or exchanging audio or audio/video messages by means of the common online audio or audio/video chat.

17. The method according to claim 16, further comprising the steps of:
- sharing, between the first and the second user's electronic device, the first or the second interaction process in a shared interaction process;
- configuring in real-time the first and the second user's electronic device to execute a step of the shared interaction process;
- further configuring the operator's electronic device to execute the step of the shared interaction process;
- verifying whether a step of the shared interaction process has been executed by means of the first and/or second user's electronic device;
- in the case of a positive verification, approving said step of the shared interaction process and repeating said configurations and verification for at least one further step of the shared interaction process;
- in the case of a negative verification, waiting for execution of the step of the shared interaction process and returning to the verification.

18. The method according to claim 14 the interaction including an interaction between a first plurality of operators and a second plurality of remote users, further comprising, between steps a) and b), the step of:
- receiving a call from the first user's electronic device and routing the call to a first operator's electronic device according to at least one preconfigured rule.

* * * * *